United States Patent
Oara

(10) Patent No.: US 11,288,043 B2
(45) Date of Patent: Mar. 29, 2022

(54) SYSTEM AND METHOD FOR CREATING A PROCESS FLOW DIAGRAM WHICH INCORPORATES KNOWLEDGE OF THE TECHNICAL IMPLEMENTATIONS OF FLOW NODES

(71) Applicant: HATHA SYSTEMS, LLC, Washington, DC (US)

(72) Inventor: Ioan Mihai Oara, Raleigh, NC (US)

(73) Assignee: HATHA SYSTEMS, LLC, Washington, DC (US)

( * ) Notice: Subject to any disclaimer, the term of this patent is extended or adjusted under 35 U.S.C. 154(b) by 0 days.

(21) Appl. No.: 17/013,130

(22) Filed: Sep. 4, 2020

(65) Prior Publication Data

US 2021/0240454 A1 Aug. 5, 2021

Related U.S. Application Data

(60) Provisional application No. 62/970,368, filed on Feb. 5, 2020, provisional application No. 62/970,556, filed on Feb. 5, 2020, provisional application No. 62/970,466, filed on Feb. 5, 2020.

(51) Int. Cl.
*G06F 8/41* (2018.01)
*G06F 16/22* (2019.01)
*G06F 8/20* (2018.01)

(52) U.S. Cl.
CPC .............. *G06F 8/433* (2013.01); *G06F 8/20* (2013.01); *G06F 16/22* (2019.01)

(58) Field of Classification Search
CPC ............. G06F 8/433; G06F 8/20; G06F 16/22

USPC ................................................. 717/104–120
See application file for complete search history.

(56) References Cited

U.S. PATENT DOCUMENTS

| | | | | |
|---|---|---|---|---|
| 5,481,741 A * | 1/1996 | McKaskle | ................ | G06F 8/34 358/1.9 |
| 6,038,538 A * | 3/2000 | Agrawal | .............. | G06Q 10/063 705/7.11 |
| 6,278,977 B1 * | 8/2001 | Agrawal | ................ | G06Q 10/10 705/7.27 |
| 6,308,224 B1 * | 10/2001 | Leymann | ................ | G05B 17/02 709/202 |
| 6,598,219 B1 * | 7/2003 | Lau | ........................... | G06F 8/24 717/108 |

(Continued)

OTHER PUBLICATIONS

Chourey et al, "Functional Flow Diagram(FFD): Semantics for Evolving Software", IEEE, pp. 2193-2199 (Year: 2016).*

(Continued)

*Primary Examiner* — Anil Khatri
(74) *Attorney, Agent, or Firm* — Nelson Mullins Riley & Scarborough LLP; Anthony A. Laurentano

(57) ABSTRACT

A system and method for associating a technical artifact with one or more portions of a process flow diagram by extracting a plurality of technical artifacts from a computing system having a plurality of software applications, providing a process flow diagram having a plurality of nodes and a plurality of edges, associating one or more of the plurality of technical artifacts with one or more of the plurality of nodes of the process flow diagram, displaying the process flow diagram, and when the node is actuated, displaying the associated technical artifact.

38 Claims, 11 Drawing Sheets

(56) References Cited

U.S. PATENT DOCUMENTS

| | | | | |
|---|---|---|---|---|
| 6,964,034 | B1* | 11/2005 | Snow | G06F 9/542 |
| | | | | 717/121 |
| 7,210,117 | B2* | 4/2007 | Kudukoli | H04L 67/12 |
| | | | | 717/109 |
| 7,334,216 | B2* | 2/2008 | Molina-Moreno | G06F 8/35 |
| | | | | 717/109 |
| 7,448,022 | B1* | 11/2008 | Ram | G06F 9/45504 |
| | | | | 717/120 |
| 7,631,006 | B2* | 12/2009 | Hagstrom | G06F 8/20 |
| 7,712,073 | B1* | 5/2010 | Srinivasan | G06F 8/10 |
| | | | | 717/104 |
| 7,814,427 | B2* | 10/2010 | Cook | G06F 8/10 |
| | | | | 715/861 |
| 8,065,655 | B1* | 11/2011 | Deo | G06F 16/367 |
| | | | | 717/137 |
| 8,065,658 | B1 | 11/2011 | Bali et al. | |
| 8,271,943 | B2* | 9/2012 | Hudson, III | G06F 8/34 |
| | | | | 717/113 |
| 8,560,956 | B2* | 10/2013 | Curtis | G06F 40/10 |
| | | | | 717/109 |
| 9,576,017 | B2* | 2/2017 | Kummer | G06F 16/2365 |
| 9,965,252 | B2* | 5/2018 | Bera | G06F 8/20 |
| 10,379,826 | B1* | 8/2019 | Klinger | G06F 8/443 |
| 10,452,366 | B2* | 10/2019 | Daniel | G06F 8/36 |
| 2003/0171947 | A1 | 9/2003 | Ledford et al. | |
| 2004/0088197 | A1 | 5/2004 | Childress et al. | |
| 2004/0088678 | A1 | 5/2004 | Litoiu et al. | |
| 2009/0241088 | A1 | 9/2009 | Dangeville et al. | |
| 2012/0159427 | A1 | 6/2012 | Oara et al. | |
| 2012/0272205 | A1 | 10/2012 | Fox et al. | |
| 2013/0047090 | A1 | 2/2013 | Bhandarkar et al. | |
| 2013/0054627 | A1 | 2/2013 | Rausch et al. | |
| 2014/0282199 | A1 | 9/2014 | Basu et al. | |
| 2015/0012329 | A1 | 1/2015 | Prakash et al. | |
| 2015/0248203 | A1 | 9/2015 | Srivastava et al. | |
| 2015/0268955 | A1 | 9/2015 | Mehalingam et al. | |
| 2015/0363197 | A1 | 12/2015 | Carback, III et al. | |
| 2015/0363294 | A1 | 12/2015 | Carback, III et al. | |
| 2016/0313979 | A1 | 10/2016 | Hadar et al. | |

OTHER PUBLICATIONS

Meng et al, "Transformation from Data Flow Diagram to UML2.0 Activity Diagram", IEEE, pp. 1010-1014 (Year: 2010).*

Guo, "Automatic Transformation from Data Flow Diagram to Structure Chart", ACM, 44-49 (Year: 1997).*

Abi-Antoun et al, "Static Extraction and Conformance Analysis of Hierarchical Runtime Architectural Structure using Annotations", ACM, pp. 321-340 (Year: 2009).*

Sharma et al, "Extracting High-Level Functional Design from Software Requirements", IEEE, pp. 35-42 (Year: 2009).*

Mefteh et al, "Implementation and Evaluation of an Approach for Extracting Feature Models from Documented UML Use Case Diagrams", ACM pp. 1602-1609 (Year: 2015).*

Berger et al, "Extracting and Analyzing the Implemented Security Architecture of Business Applications", IEEE, pp. 285-294 (Year: 2013).*

Sangal et al, "Using Dependency Models to Manage Complex Software Architecture", ACM, pp. 167-176 (Year: 2005).*

Erol et al. "Combining BPM and social software: contradiction or chance?" Journal of software maintenance and evolution: research and practice 22.6-7 (2010): 449-476. Apr. 29, 2010 (Apr. 29, 2010) Retrieved on Mar. 27, 2021 (Mar. 27, 2021) from <https://onlinelibrary.wiley.com/doi/abs/10.1002/smr.460>.

International Search Report and Written Opinion, PCT/US2021/016795, dated May 4, 2021, 13 pages.

International Search Report and Written Opinion, PCT/US2021/016796, dated Apr. 23, 2021, 11 pages.

International Search Report and Written Opinion, PCT/US2021/016799, dated Apr. 15, 2021, 15 pages.

Leon. "The future of computer-aided innovation." Computers in Industry 60.8 (2009): 539-550. Jun. 27, 2009 (Jun. 27, 2009) Retrieved on Mar. 28, 2021 (Mar. 28, 2021) from <https://www.sciencedirect.com/science/article/abs/Pii/30166361509001286> entire document.

* cited by examiner

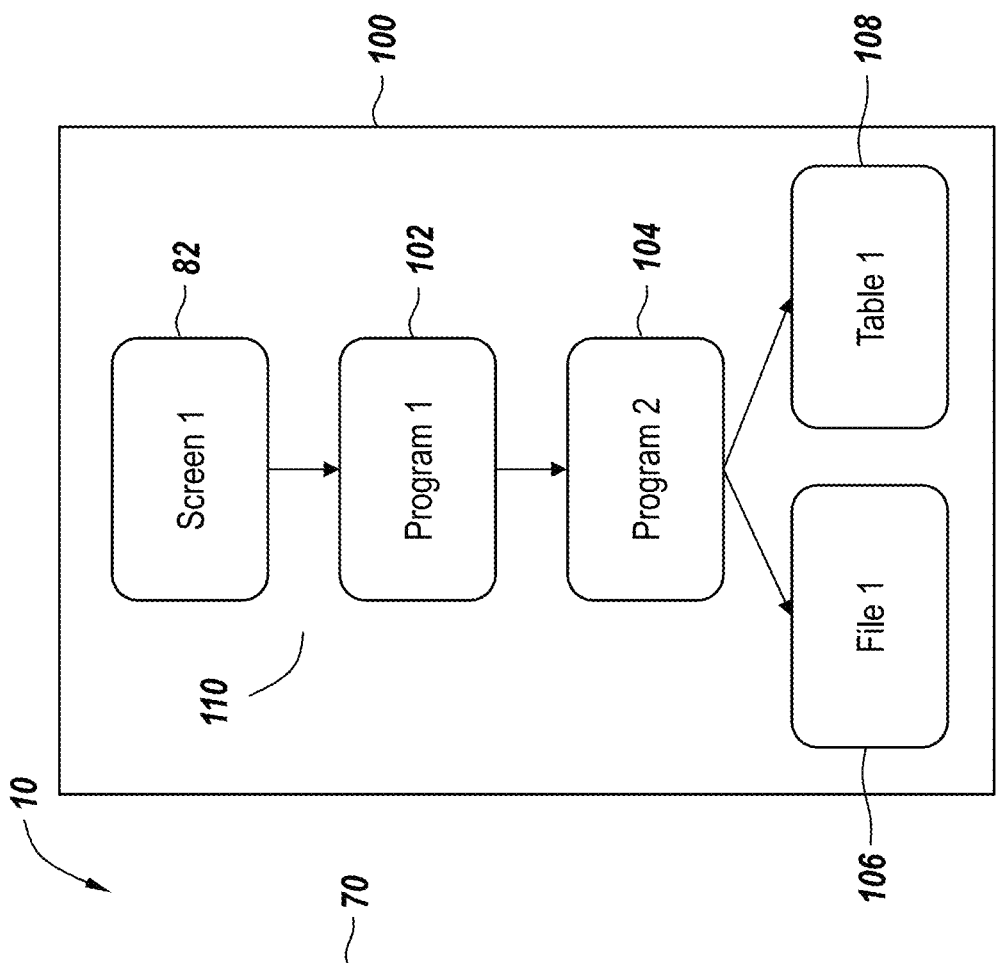
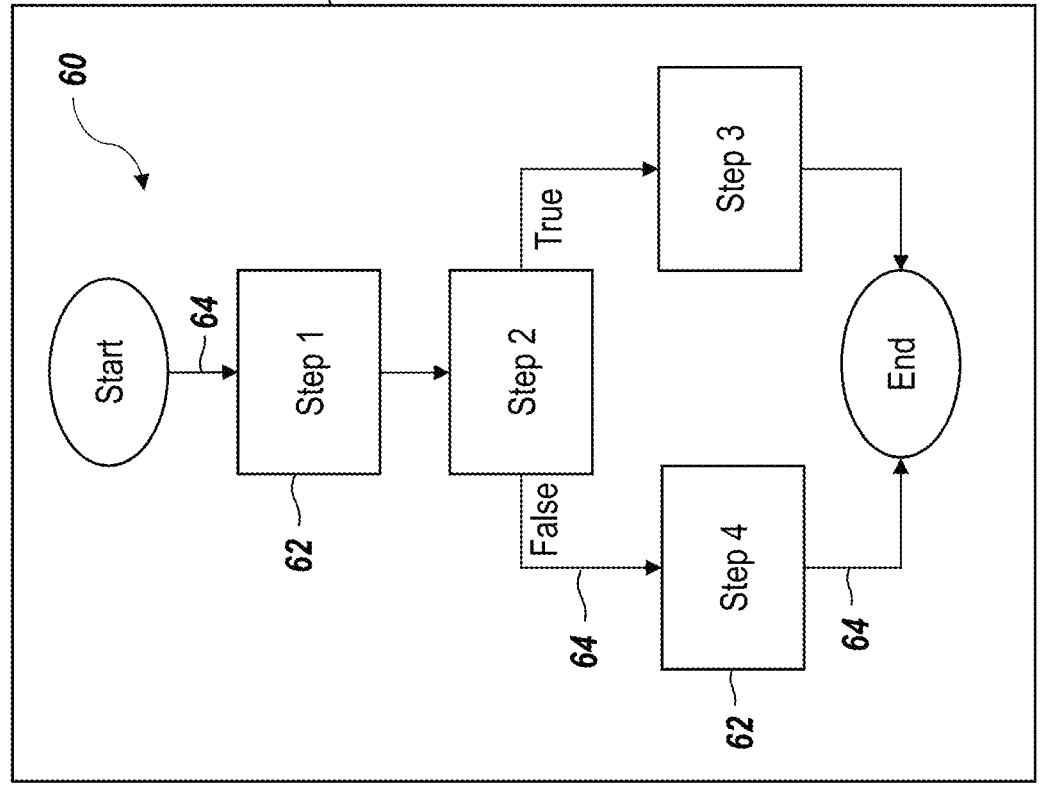
*Fig. 5*

| Process Node | Deletes | Reads | Writes |
|---|---|---|---|
| (Check Facts)INQMAP3 | | (LogicalFile)CUSTMAS<br>(LogicalFile)INVPATH | |
| (Create Order)Create order | | (LogicalFile)CUSTMAS<br>(LogicalFile)PRODUCT | (LogicalFile)INVCTL<br>(LogicalFile)INVOICE |
| (Create Order)Is the customer registered? | | (LogicalFile)CUSTMAS<br>(LogicalFile)INVPATH | |
| (Create Order)Register customer | (LogicalFile)CUSTMAS | | |
| (Process Mark)Confirm invoice | | (LogicalFile)CUSTMAS<br>(LogicalFile)PRODUCT | (LogicalFile)INVCTL<br>(LogicalFile)INVOICE |
| (Process Mark)Verify invoice | (LogicalFile)CUSTMAS | | |

Fig. 8

| Data Store 242 | Deletes 244 | Reads 246 | Writes 248 |
|---|---|---|---|
| (LogicalFile)CUSTMAS | (Create Order)Register customer (Process Mark)Verify invoice | (Create Order)Register customer (Process Mark)Verify invoice (Create Order)Is the customer registered? (Check Facts)INQMAP3 (Create Order)Create order (Process Mark)Confirm invoice | (Create Order)Register customer (Process Mark)Verify invoice |
| (LogicalFile)INVCTL | | (Create Order)Create order (Process Mark)Confirm invoice | (Create Order)Create order (Process Mark)Confirm invoice |
| (LogicalFile)INVOICE | | | (Create Order)Create order (Process Mark)Confirm invoice |
| (LogicalFile)INVPATH | | (Create Order)Is the customer registered? (Check Facts)INQMAP3 | |
| (LogicalFile)PRODUCT | | (Create Order)Create order (Process Mark)Confirm invoice | |

*Fig. 9*

SYSTEM AND METHOD FOR CREATING A PROCESS FLOW DIAGRAM WHICH INCORPORATES KNOWLEDGE OF THE TECHNICAL IMPLEMENTATIONS OF FLOW NODES

RELATED APPLICATIONS

The present applications claims priority to U.S. Provisional patent application Ser. No. 62/970,466, filed Feb. 5, 2020, and entitled SYSTEM AND METHOD FOR CREATING A BUSINESS PROCESS DIAGRAM WHICH INCORPORATES KNOWLEDGE OF THE TECHNICAL IMPLEMENTATIONS OF FLOW NODES, and is related to and claims priority to U.S. Provisional patent application Ser. No. 62/970,368, filed Feb. 5, 2020, entitled SYSTEM AND METHOD FOR CREATING A BUSINESS PROCESS DIAGRAM, and U.S. Provisional patent application Ser. No. 62/970,556, filed Feb. 5, 2020, and entitled SYSTEM AND METHOD FOR CREATING A BUSINESS PROCESS DIAGRAM WHICH INCORPORATES KNOWLEDGE OF BUSINESS TERMS USED IN EACH STEP, the contents of which are herein incorporated by reference.

BACKGROUND OF THE INVENTION

The present invention is related to the creation of process flow diagrams, and is specifically related to the creation of process flow diagrams that are linked to and based on other system software.

As is known in the art, process flow diagrams are widely used for various purposes. In general, a process flow diagram consists of a number of nodes representing activities and edges between the nodes indicating the order in which the activities are to be performed. There can be nodes of various types, such as for example a "start node" or a "user task" or a "subsystem node." Existing software tools supporting the creation of process flow diagrams usually indicate for each node both the type of node and the name of the node, which is customizable. The edges of the process flow diagram can be annotated if desired to show a regular flow or a true flow (e.g., to be followed only when a condition expressed by the source of the edge is true) or a false flow (e.g., when the condition is false).

Process flow diagrams can be employed to describe a specific business process, such as for example, how a user interacts with a software system in order to achieve a specific goal. For instance, to create a new customer account at a bank, a clerk, such as an operator, may be using a software application called Accounts. The clerk may perform a number of "manual" steps, such as asking the customer various questions or calling a manager for approval. However, it is expected that most of the steps can be accomplished with the aid and through interaction with an Accounts software application.

Traditional process flow diagrams typically describe all the steps performed by the operator or clerk, as well as the order of the steps or possible branches in the process flow diagram. An operator can review the diagram and readily understand the process flow, such as in the above example how the clerk proceeds to create a new account.

A disadvantage of the traditional systems for creating the process flow diagrams is that the operator is unable to determine which software application or combination of software applications are employed, and how the software application which supports each of the process steps actually works. This missing information may be very important for the people who manage the application. For example, if a step or a flow in the process is to be modified for business reasons, it raises the questions whether the application system supporting the process has to be modified or more importantly which software applications, screens or tables need to be modified.

SUMMARY OF THE INVENTION

The present invention is directed to a system and method for combining a process flow diagram with information related to the technical information or artifact (e.g., technical implementation) of the software application supporting the process (e.g., a supporting or target software application). This combination provides important information to the operator of the system or business analysts involved with the application. For example, a user of the system can determine which software applications are employed during the execution or creation of a process or process flow diagram. Further, if changes are made to the process flow diagram, the user can easily determine which software applications need to be modified as well. The linking together of process flow diagrams and associated data with data associated with underlying software applications is an object of the present invention.

The present invention is also directed to a system and method for building or creating a process flow diagram in which both process nodes and nodes representing technical artifacts from a software application are incorporated therein. The entities representing the technical artifacts which support the software application are selected and imported into the process flow diagram. The process flow diagram, the node types and the technical artifacts can have computer representations and can be associated with one or more target applications. The process nodes and the technical artifact nodes are connected through an implementation relationship that signifies that a process step is implemented by the technical artifact.

The present invention also includes a system and method in which each node representing a technical artifact may be either manually or automatically expanded by adding to the diagram nodes, as well as representation of the technical artifacts to which the node is related, such as programs conversing with user interfaces, programs called by another program, or data stores accessed by the programs.

The present invention is directed to a method performed by at least one computer processor for associating a technical artifact with one or more portions of a process flow diagram. The method comprises extracting a plurality of technical artifacts from a computing system having a plurality of software applications, wherein the plurality of software applications includes one or more target applications; providing a process flow diagram having a plurality of nodes and a plurality of edges; associating one or more of the plurality of technical artifacts with one or more of the plurality of nodes of the process flow diagram; displaying the process flow diagram; and when the node is actuated, displaying the associated technical artifact. Each of the plurality of technical artifacts comprises one or more supporting technical functions of the computing system, one or more of a software object, a batch job, a screen, a window, one or more panes of the window, a page, a web service, a script, a table, or a file.

According to the method, the step of associating further comprises selecting, by an operator, one or more of the technical artifacts and then associating the selected technical artifact with the one or more nodes, and wherein the step of providing a process flow diagram comprises creating the process flow diagram or importing the process flow diagram. The method also includes actuating the node and selecting the associated technical artifact, and displaying an architecture of the technical artifact.

The present invention is also directed to a system for associating a technical artifact with a process flow diagram, comprising a data extraction unit for extracting one or more technical artifacts from a plurality of software applications, wherein the plurality of software applications includes one or more target software applications; a project explorer tool for receiving the technical artifacts and for forming a list of the technical artifacts; a process flow diagram unit for providing a process flow diagram having a plurality of nodes and a plurality of edges; an architecture diagram unit for generating an architecture of each of the plurality of technical artifacts; and a visual application unit for displaying the process flow diagram generated by the process flow diagram unit and for displaying the technical artifacts from the project explorer tool.

The data extraction unit extracts instances where at least one of the plurality of software applications accesses at least another one of the plurality of software applications where the instances form the technical artifacts, or the data extraction unit extracts instances when at least one of the plurality of software applications accesses a data store through a programmatic operation. The data store can include one of a table, a record, and a file.

Further, an operator can select at least one of the technical artifacts and associate the selected technical artifact with one of the plurality of nodes. Specifically, the project explorer tool further comprises means to associate one or more of the plurality of nodes with one or more of the technical artifacts.

According to another aspect of the present invention, the architecture of each of the technical artifacts generated by the architecture diagram unit includes programmatic relationships between the node representing the artifact and one or more of the nodes representing other technical artifacts. The programmatic relationships include one or more of programmatic calls, data access operations, send requests, or read requests. The process flow diagram unit can employ a flow modeling software application to generate the process flow diagram. The flow modeling software application includes a Business Process Model and Notation (BPMN) model or a Unified Modeling Language (UML) model.

According to the present invention, the system can further include a storage unit for storing information about the technical artifacts extracted by the data extraction unit, wherein the storage unit includes a database for storing the information about the technical artifacts. The system can also employ one or more computer processors programmed to display a plurality of flow diagram nodes and edges representing flows therebetween; display the plurality of nodes representing the technical artifacts and edges representing relationships therebetween; create the process flow diagram by selecting one or more of the plurality of node types and flow types and instantiating them in the process flow diagram; select one of the plurality of technical artifacts and associate the selected technical artifact with one of the plurality of nodes; and generate an implementation relationship between the technical artifact and the process node, such that the technical artifact executes the process node. The processor is further programmed to connect each of the plurality of nodes with at least another one of the plurality of nodes and forming an edge therebetween, thus forming a sequence of steps in the process flow diagram. The plurality of node types are displayed in a list in the form of a toolbox. Further, at least one of the plurality of nodes is associated with the technical artifact, and wherein the target software is implementing the function of the technical artifact.

According to another aspect, the system of the present invention can include one or more computer processors programmed to display a plurality of flow diagram node types or edge types; display the plurality of technical artifacts; display the process flow diagram; select one of the plurality of technical artifacts and associate the selected technical artifact with one of the plurality of nodes of the process flow diagram; and generate an implementation relationship between the technical artifact and one or more associated target applications. The processor can be further programmed to connect each of the plurality of nodes with at least one other of the plurality of nodes with at least one of the plurality of edges so as to form a sequence of steps. The plurality of node types are displayed in a list in the form of a toolbox.

The present invention also includes a computer implemented method for associating a technical artifact with a process flow diagram, the method comprising extracting one or more technical artifacts from a plurality of software applications, wherein the plurality of software applications includes one or more target software applications; receiving the technical artifacts and forming a list of the technical artifacts; generating a process flow diagram having a plurality of nodes and a plurality of edges; based on a user request, generating an architecture diagram of each of the plurality of technical artifacts; selecting at least one of the technical artifacts and associating the selected technical artifact with one of the plurality of nodes; and displaying the process flow diagram and the architecture diagram for each of the associated technical artifacts.

The method of the present invention can further include extracting instances when at least one of the plurality of software applications, functions, or methods accesses a data store through a programmatic operation. The programmatic operation comprises one or more of a read operation, a write operation, a select operation, an update operation, an insert operation and a delete operation. Further, the architecture of each of the technical artifacts includes programmatic relationships between the technical artifact and one or more of the other technical artifacts, and the programmatic relationships include send, receive or call relationships.

The method can also include displaying a plurality of flow diagram node types or edge types, generating the process flow node by selecting one or more of the plurality of node types, and generating an implementation relationship between the technical artifact and one or more other technical artifacts. Further, the method includes connecting each of the plurality of nodes with at least another one of the plurality of nodes through an edge so as to form a sequence of steps, and displaying the plurality of node types and the plurality of edge types in a list in the form of a toolbox for use in creating the nodes and the edges.

The present invention can also include a non-transitory, computer readable medium comprising computer program instructions tangibly stored on the computer readable medium, wherein the computer program instructions are executable by at least one computer processor to perform a method, the method comprising extracting one or more technical artifacts from a plurality of software applications, wherein the plurality of software applications includes one or more target software applications; receiving the technical artifacts and forming a list of the technical artifacts; generating a process flow diagram having a plurality of nodes and a plurality of edges; generating an architecture of each of the plurality of technical artifacts; selecting at least one of the technical artifacts and associating the selected technical artifact with one of the plurality of nodes; and displaying the process flow diagram and for each process node which has an associated technical artifact, displaying an architecture diagram of the associated technical artifact.

The computer readable medium can further include extracting instances when at least one of the plurality of technical artifacts representing a program, function, procedure or method accesses a data store through a programmatic operation. The programmatic operation comprises one or more of a read operation, a write operation, a select operation, an update operation, an insert operation and a delete operation. Further, the architecture of each of the technical artifacts includes programmatic relationships with other technical artifacts, such as calls, receives or sends.

The computer readable medium can further include the process of displaying a plurality of flow diagram node types or edge types, generating the process flow diagram by selecting one or more of the plurality of node types or edge types, generating an implementation relationship between the technical artifact and one or more associated nodes, and connecting each of the plurality of nodes with at least another one of the plurality of nodes through at least one of the plurality of edges so as to form a sequence of steps. The one or more of the plurality of nodes has a function associated therewith, wherein the implementation relationship includes information of the target software applications that are implementing the function associated with the node.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

FIG. 5 is a schematic diagram of the system of the present invention showing a process flow diagram in a first window and a separate window in which the architecture of the target application is shown, including the associated applications or software programs and the data stores employed by the application during execution of the operations associated with the nodes

FIG. 8 is a report that can be generated by the system of the present invention showing the process nodes and associated target application as well as the communications functionality associated therewith.

FIG. 9 is a report that can be generated by the system of the present invention showing various data stores and programmatic functions that can be associated with a process node according to the teachings of the present invention.

DETAILED DESCRIPTION

Figure 1:
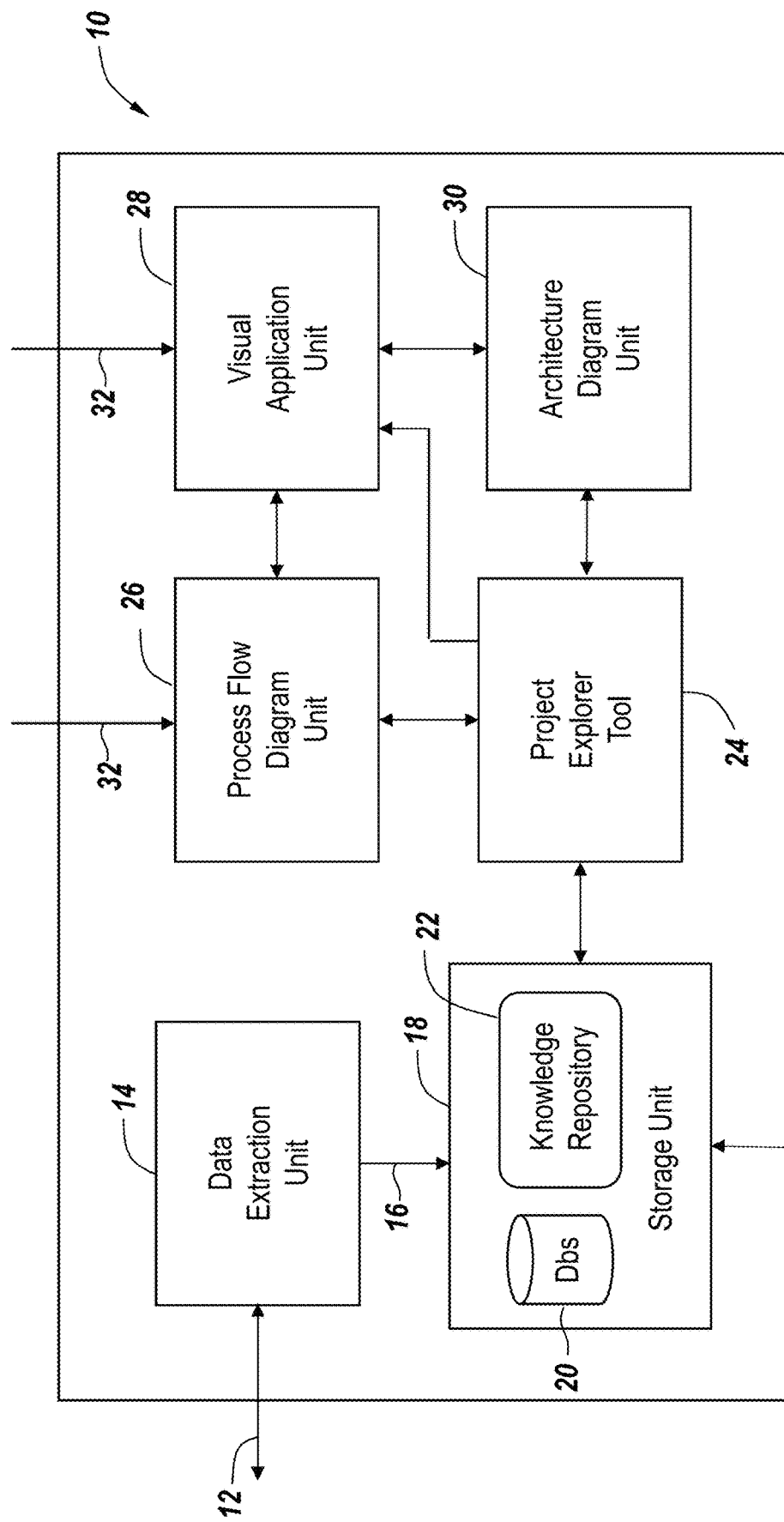
FIG. 1 is a schematic block diagram of the process flow identification system according to the teachings of the present invention.

The present invention is directed to a system and method for combining information associated with a process flow diagram with information related to the technical information or artifact regarding a supporting, target or underlying software application. This combination provides important information to the operator of the system or business analysts involved with the application.

The term "target application" or "supporting application" as used herein is intended to designate a software application or program which performs one or more operations under the direction of an operator, such as a human actor, related to an action performed by the operator, or related to the operation of another software application.

The term "operator" is used to designate the human or end user who is utilizing the system and the method of the present invention.

The term "end user" is used to designate a user of the target application or another software application.

The term "process node" as used herein is intended to designate a node on a process flow diagram, which describes a step in the execution of a process, as represented by the process flow diagram. In most process flow diagrams or models, this may be a start node, an end node, a task node, a subprocess node or a gateway node, or some other type of a standard or proprietary process model.

The term "process flow diagram" as used herein is intended to include any flow or method of a process that includes a series of functional steps or actions. The process flow diagram can include a series of nodes (process nodes) that are linked together by edges or flows. The process nodes and edges can have selected data associated therewith. For example, the process nodes can have data associated therewith about a specific step in the process, identification data, attribute data, technical artifact data, and the like. The edges or flows serve to connect selected ones of the process nodes together and can have data, such as attribute data, technical artifact data and the like associated therewith.

The term "technical feature" or "technical artifact" as used herein is intended to designate one or more supporting or underlying technical functions of the applications or system, and is utilized to support or execute programmatic operations or functions associated with one or more process nodes and/or edges of a process flow diagram. The technical function can include one or more software applications, one or more application components, one or more software objects, such as a screen or a window (i.e., user interfaces), one or more panes of the window, a page, a web service, a script, a table, a file, a batch job, or some other type of software component which describes an abstract representation of the technical function or software application. The technical artifact is intended to include and can be displayed using a graphical element or other abstract representation of the underlying artifact.

The term "user interface" as used herein refers to any technical artifact in a software application, which is used to present data to an operator or end user or acquire data from an operator or end user. The user interfaces can include screens, windows, panes, forms, pages or reports.

The term "application" or "software application" or "program" as used herein is intended to include or designate any type of procedural software application and associated software code which can be called or can call other such procedural calls or that can communicate with a user interface or access a data store. The software application can also include called functions, procedures, and/or methods.

The term "data store" as used herein is intended to include any physical or logical device which holds or stores data, including data processed by the software application. The data stores can include tables, records, segments, indexed files or sequential files.

The term "architecture diagram" or "architecture" as used herein is intended to include a representation of relationships between any combination of user interfaces, software applications, software objects, and/or data stores of the technical artifact. The representations can indicate or show which software applications or programs communicate (e.g., take data or place data) with selected user interfaces, as well as which programs communicate with or call other programs and which programs access data stores to read, update, insert or delete data. The architecture diagram can show some or all of such relationships.

The process flow identification system 10 of the present invention is shown in FIG. 1. The illustrated system 10 employs a computing system that has one or more units, modules, systems, or sub-systems. According to the present invention, the system 10 includes a data extraction unit 14 for acquiring or extracting data 16 associated with the various types of communication between software applications employed by the system 10 or between the system 10 and one or more associated systems or software applications. The data extraction unit 14 can capture the relationships between various technical artifacts involved in the various applications employed by the system 10, and can extract or acquire this information via the communication channel 12. In particular, the data extraction unit 14 can acquire and/or extract the instances where software applications, functions, or methods are communicating with other software applications, functions or methods in the system 10 or associated systems or software applications. For example, and according to one practice, the data extraction unit 14 can capture, acquire or extract instances where a software application or function or method communicates with another software application or function or method, such as for example through a system call with a return or one without a return (e.g., an exclusive transfer of control). The data extraction unit 14 also captures or extracts the various instances when a software application or function or method is accessing a data store, such as a table or record or file, through a programmatic operation, such as a read, write, select, update, insert or delete operation. The extracted data 16 as acquired, captured or extracted helps establish the connections between the process flow steps as seen by a human and the operations performed by the target or supported application. The data extraction unit 14 can be implemented using known reverse engineering tools or applications, such as for example by using software analysis tools, and preferably software static analysis tools. Examples of suitable software static analysis tools includes Apache Yetus, Axivion Bauhaus, Coverity, and the like. Further, the communication channel 12 is represented in simplified form for ease of illustration and can be any selected communication mechanism or technology that allows the data extraction unit 14 to communicate with other elements, applications and/or components of the process flow identification system 10, and includes for example one or more buses, memory and the like.

The illustrated process flow identification system 10 further includes a storage unit 18 for storing the extracted data 16 that is received from the data extraction unit 14. The storage unit 18 can be any selected type of storage unit 18 as is known in the art. According to one practice, the storage unit 18 can include a database 20 for storing the data 16. The database can be any selected type of database, and is preferably a relational database. The database 18 serves as a storage device for a knowledge repository 22, which can be implemented in connection with (e.g., on top of) the database, and which can be configured to store the extracted data 16 as well as any description of any associated process flow or process flow diagrams. Consequently, the knowledge repository 22 can be used to store and make available for retrieval information associated with and about the software application architecture as well as the process flow diagrams referenced herein.

With further reference to FIG. 1, the storage unit 18 communicates with a project explorer tool or application 24 for displaying in any selected form or format, such as in a list format, the technical artifacts, which can include for example representations, such as abstract or graphical representations, of screens, batch jobs, programs and/or data stores that are acquired or extracted by the data extraction unit 14. Once displayed, such as for example via the visual application unit 28, the operator can inspect the list of technical artifacts and any associated properties, and if desired select one or more of the technical artifacts for further action or processing. The project explorer tool 24 can also communicate with if desired a process flow diagram unit 26 for allowing the operator through a user selection unit or means 32 to create, generate, or import nodes in a process flow diagram. Specifically, the process flow diagram unit 26 allows the operator to display a process flow diagram either imported or created and also allows the operator through the user selection unit 32 to manipulate, such as add, delete or modify, process flow nodes and edges therein. The user selection unit 32 can employ if desired any known type of user section device or mechanism, such as a computer mouse or keyboard, to allow or enable the operator to select a feature, option or element from the displayed information. The project explorer tool 24 also helps connect, link or associate one or more flow nodes with one or more of the technical artifacts, such as screens. This association is automatically created when the user selects a technical artifact to create a flow node based thereon. For example, when the user selects an a representation of a screen, a flow node is created indicating that in the flow diagram process the user or operator utilizes that screen to perform a selected action, and the flow node is then automatically associated with this screen. The process flow diagram unit 26 can also communicate with a visual application unit 28 for displaying the process flow diagram created by the process flow diagram unit 26 as well as the technical artifacts acquired or extracted by the data extraction unit 14. Further, the visual application unit 28 allows the operator through the user selection unit 32 to modify, edit or delete any of the selected information displayed therein. Hence, the extracted data 16 and associated technical artifacts and the process flow diagram, as well as other aspects of the system, can be displayed.

The process flow identification system 10 can also include an architecture diagram unit 30 which can generate the architecture around selected technical artifacts and display the architecture of the technical artifacts via the visual application unit 28. The architecture of the technical artifacts includes programmatic relationships, such as programmatic calls, reads or send requests, represented as edges between boxes representing the technical artifacts. The architecture diagram unit 28 can thus retrieve and store data associated with the technical artifacts. The architecture diagram unit 30 can be a separate stand-alone unit or can form part of the process flow diagram unit 26. An example of an architecture of a technical artifact is shown for example in FIG. 7. While the process flow diagram shows the nodes or steps in a process, and thus are at a higher level of abstraction, the architecture diagram can show or illustrate the actual technical implementations associated therewith. Thus, according to the present invention, these two types of diagrams are related, as each process node in the process flow diagram has an association with a technical artifact node in the architecture diagram.

The process flow diagram unit 26 can be implemented using various metamodels, which can be proprietary or standard. As is known, metamodeling is the analysis, construction and development of the frames, rules, constraints, models and theories applicable and useful for modeling a predefined class of problems, such as steps in a business process. The process flow diagram unit 26 according to one practice can also be implemented using known process flow modeling applications that are capable of generating and/or describing the nodes and edges of a process flow diagram, such as for example by a Business Process Model and Notation (BPMN) application or a Unified Modeling Language (UML) application.

The process flow identification system 10 and associated method described herein can be implemented by a number of different and various operations. The operations associated with the process flow diagram can be performed in a certain pre-determined or fixed order or may be performed in a preferred order as the process flow diagram is edited and modified by the operator. The description below sets forth the process flow steps in a selected order as the flow diagram is initially constructed or created by the process diagram unit 26. The operator of the system and associated method can then modify or edit the process flow diagram as desired. The process flow identification system 10 of the present invention allows the operator via suitable input data or commands 32 to create a process flow diagram and connect certain nodes of the process flow diagram to representations of the technical artifacts (e.g., screens, windows or forms) in or by which the node or step is implemented in software. This may be accomplished in various ways.

According to a first implementation, the process nodes can be connected with the technical artifacts or more specifically with the representations of the technical artifacts by importing the technical artifacts into a previously created or imported process flow diagram. This can be generally accomplished via any suitable manipulation or control mechanism or user selection device, such as a conventional drag and drop operation in which the selected technical artifact as displayed in a display via the visual application unit 28 is grabbed with the user selection device, such as a mouse, and is dragged and a dropped into the process flow diagram by the operator. Alternatively, the operator can select the technical artifact as displayed via the project explorer tool 24 and the visual application unit 28 and can use a menu or a soft button feature to include or import the technical artifact into the process flow diagram. When the technical artifact is imported into the process flow diagram, the artifact is automatically transformed into a process node entity and a relationship between the specific process node and the originally selected technical artifact, designated as an "implementation" relationship, which is recorded and stored together with other information about the process flow diagram. The "implementation relationship" is a relationship between a flow node in a process flow diagram and a technical artifact (e.g., representation of the technical artifact), where the technical artifact can appear in an associated architecture diagram. The user can then if desired modify the name of the resulting node to a more user friendly and business-related node name, such as for example "Create order" or "Ship the product." As the nodes in the process flow diagram are created by the operator, the operator can subsequently connect the nodes with edges or arcs representing process flows so as to form or create a sequence of steps, indicating for instance that the user can first execute the step "Create order" and then next execute the "Ship the product" step.

According to a second implementation, the operator can create the process flow node. According to one practice, the operator can add one or more process nodes of various types to the process flow diagram by selecting the node from a toolbox (e.g., list of nodes), and then drag and drop the selected node into the process flow diagram. After the node is created, the operator can rename the node as desired. The resulting nodes can then be joined by edges or arcs representing process flows. At each point, after a process node is created, the operator can select a technical artifact from a list of technical artifacts (e.g., representations of technical artifacts) provided by the project explorer tool 24. Once associated with the node, the system 10 and specifically the project explorer tool 24 or the process diagram unit 26 connects the technical artifact to the process node via the implementation relationship. This can be performed using soft buttons, menus or drag and drop features, in which the technical artifact is grabbed from the project explorer tool 24 and dropped over or on the displayed process node.

The operator may also use a combination of the two above technical artifact association methodologies. As described above, each of the process nodes can have optionally associated therewith a technical implementation, which is an implementation relationship with an associated technical artifact. However, there may be a node in the process flow diagram that requires operator action rather than an action to be performed by one or more applications of the system 10. By simple way of example, the process flow diagram can include a node named "Receive phone request," which is a step that occurs through human interaction as opposed to actions performed by a software application. This may be followed by nodes in the process flow diagram that are implemented by software, such as for example "Sign into the Accounts application."

Figure 2:
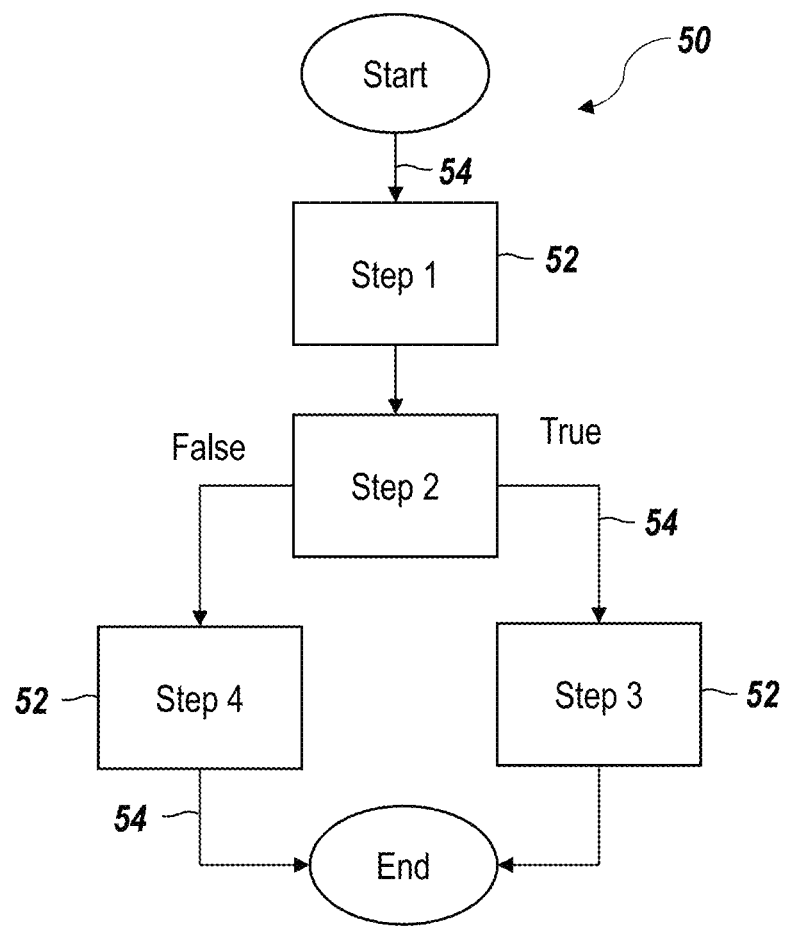
FIG. 2 is a schematic flow chart diagram of a simple traditional process flow diagram, with a start node, one or more task nodes, flow branches, and an end node.

FIG. 2 is an example of a conventional process that can be implemented by a conventional process flow diagram 50. The process flow diagram 50 can be implemented by the process flow diagram unit 26 using various metamodels, including for example the BPMN or UML applications. As shown, the illustrated process 50 includes a series of nodes or steps 52 that are connected by a series of arcs or edges 54. The process flow diagram 50 starts at a Start node and then the process proceeds to step 1, which can be associated with one or more automated or manual tasks. The step 1 node 52 then proceeds to the step 2 node, and any task associated therewith can be performed by the system and/or the operator. The nodes in the process flow diagram 50 are coupled by arcs or edges 54. After the step 2 node, the process flow branches into a pair of branches corresponding to steps 3 and 4. For example, if the condition set forth in step 2 is true, then the process flow diagram proceeds to the node corresponding to step 3, and if the condition is false then the process flow continues to the node corresponding to step 4. After the steps are completed, the process ends at the end node.

Figure 3:
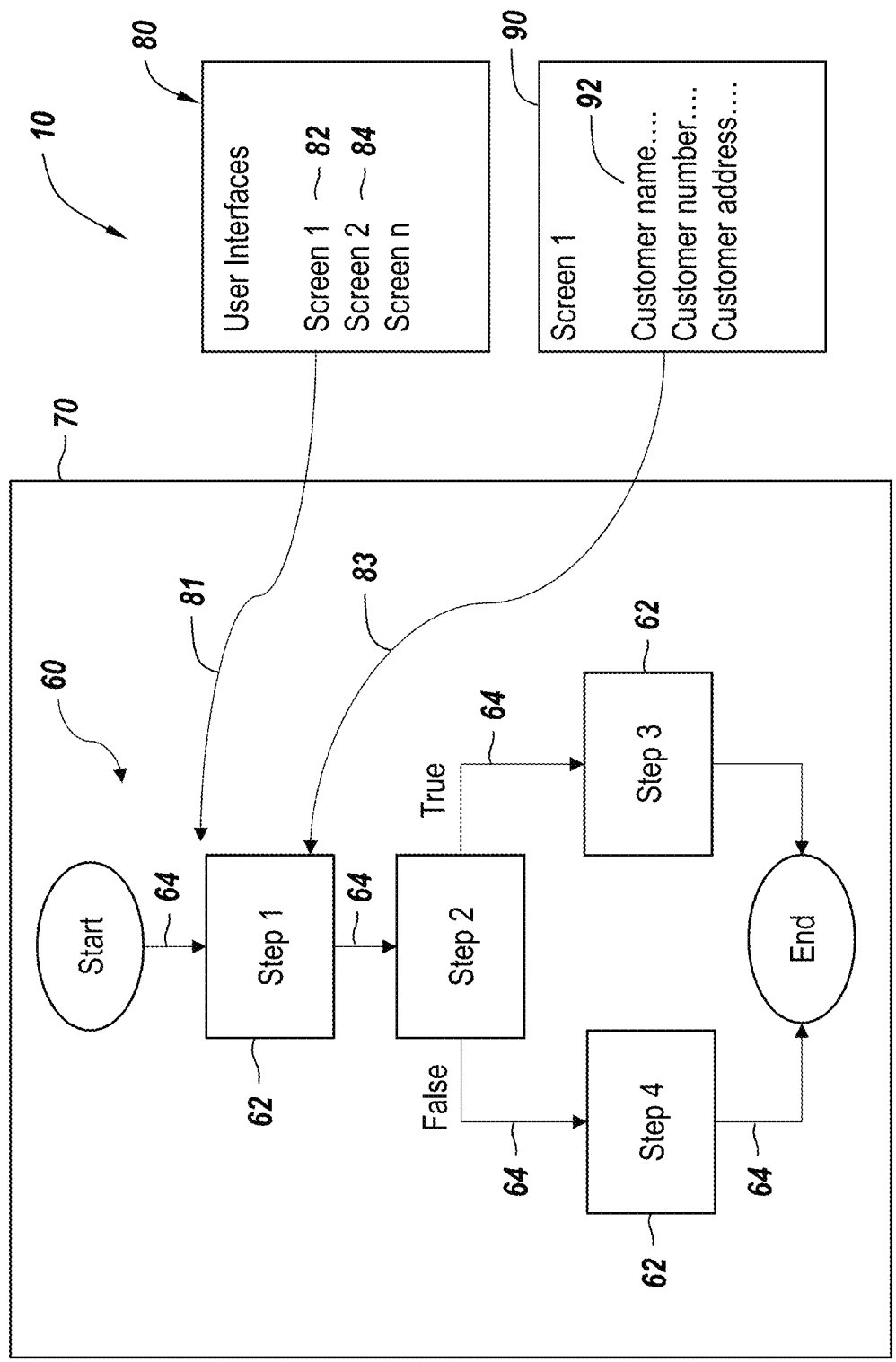
FIG. 3 is a schematic depiction of a process flow diagram on a display with one or more technical artifacts from a list of technical artifacts imported into the process flow diagram by an operator according to the teachings of the present invention.

In contrast to the conventional process flow diagram 50, the process flow identification system 10 of the present invention also displays in addition to the process flow diagram a set of technical artifacts that the operator can relate, assign or connect with selected steps of the process flow diagram. FIG. 3 illustrates the process flow identification system 10 generating and/or displaying a process flow diagram 60 and then showing the interaction between one or more nodes in the process flow diagram 60 with one or more technical artifacts. The process flow diagram 60 is displayed on a display 70, such as via the visual application unit 28 or the process flow diagram unit 26. The technical artifacts 16 are acquired or extracted by the data extraction unit 14. As shown, the process flow identification system 10 identifies the technical artifacts involved in or associated with the process flow diagram 60. According to one example, the technical artifacts can be displayed in any selected form or format, such as for example in list form. The list of technical artifacts 80 can include screens or user interfaces, windows, forms, methods, tables, files, and the like, and in the illustrated example includes user interfaces such as windows or screens of the one or more target applications. The list of user interfaces includes for example Screens 1-*n*. The user interfaces of the target application are usually limited in number, and can range from a single user interface to a several hundred interfaces. A large number of user interfaces makes the target application difficult to understand and use by the operators who utilize the process flow identification system 10 of the present invention. For example, if one of the process steps in a process flow diagram is "Confirm reservation," a user interface may be identified, within which the user of the target application is confirming a reservation.

The illustrated process flow diagram 60 includes a plurality of nodes 62 that are named Steps 1-4, and are connected via associated arcs or edges 64. The illustrated process flow diagram 60 can be created by the operator by employing the process flow diagram unit 26. The process flow or the process flow diagram can include multiple different steps or actions. For example, the initial step or action can involve constructing a process as seen by the people, users or operators who perform the actions. For simple ease of explanation, a hypothetical bank clerk can interact with a customer and may (1) ask the customer what type of account she wishes to open, (2) login to the Accounts application on her computer, (3) enter customer data in the screen or display, (4) save the entered data in the application, (5) from a soft button on the display generate a new customer account, and then (6) print the information about the account and hand it to the customer. The process nodes 1-6 described above illustrate the steps or actions in the above process, while the flows or edges between the nodes describe the order of operations. The edges need not be strictly sequential. For example, the clerk may ask if the customer wishes to open a personal account or a business account. At this point, there is a branch in the flow, and depending on the answer, the clerk may follow one branch or the other.

With reference again to FIG. 3, the nodes 62 named STEPS 1-4 are associated with selected steps or actions in a selected business process. Once the process flow diagram 60 is generated, the operator 32 can import 81 one or more technical artifacts 82, 84 (e.g., a selected user interface) from the list of technical artifacts 80 into the process flow diagram 60. The list of technical artifacts 80 (e.g., representations of the technical artifacts) can be displayed in a separate window or pane. According to one practice, the operator can import 81 via a drag and drop operation one of the technical artifacts 82 (e.g., Screen 1) into a flow node of the process flow diagram 60. The operator can associate or connect the imported technical artifact 82 with a selected node 62 (e.g., node Step 1) of the process flow diagram. Those of ordinary skill in the art will readily recognize that the technical artifact can also be imported by other techniques, such as by selecting the technical artifact from a toolbox or through a software menu. Alternatively, rather than drag and drop the technical artifact onto a node, the technical artifact can be dropped on the process flow diagram 60 in general. The operator then associates the imported technical artifact with an implementing user interface of the one or more target applications, such as for example by drawing a line between items in the diagram. The operator can view the imported Screen 1 by actuating 83 the node via a user selection device or unit if the technical artifact is associated therewith or by clicking on the imported artifact. The particulars 92 of the technical artifact 82 (e.g., Screen 1) can then be displayed, and are set forth in display window 90. The particulars can include any selected information or data about the technical artifact, and which is preferably related to the subject matter of the process flow diagram. The particulars 92 of the Screen 1 can include, in the current hypothetical example, the customer name, number and address. This process can continue for each process node 62, and hence if desired additional technical artifacts (e.g., Screens) can be associated with additional nodes 62. This enables the operator and the system 10 to determine which underlying technical artifacts, such as windows or panes, are used by a specific process node 62 in the process flow diagram 60. For example, the node 62 entitled Step 1 can be associated with the Screen 1 artifact 82 from the list of artifacts 80. The importing process can continue until the pertinent technical artifacts are associated with the corresponding nodes 62.

According to another optional practice, the operator can right click via a mouse on a selected node 62 (e.g., Step 1 node) and obtain a context menu, with a submenu feature entitled in the current hypothetical example "Connect to a user interface." When clicked, the menu shows a list of user interfaces 80 (e.g., technical artifacts) in the target application, and the operator selects one of interfaces (e.g., Screen 1) in the list. Conversely, the operator can select a user interface from another window or pane, right click thereon and then click on "Connect to a process step" submenu.

Figure 4:
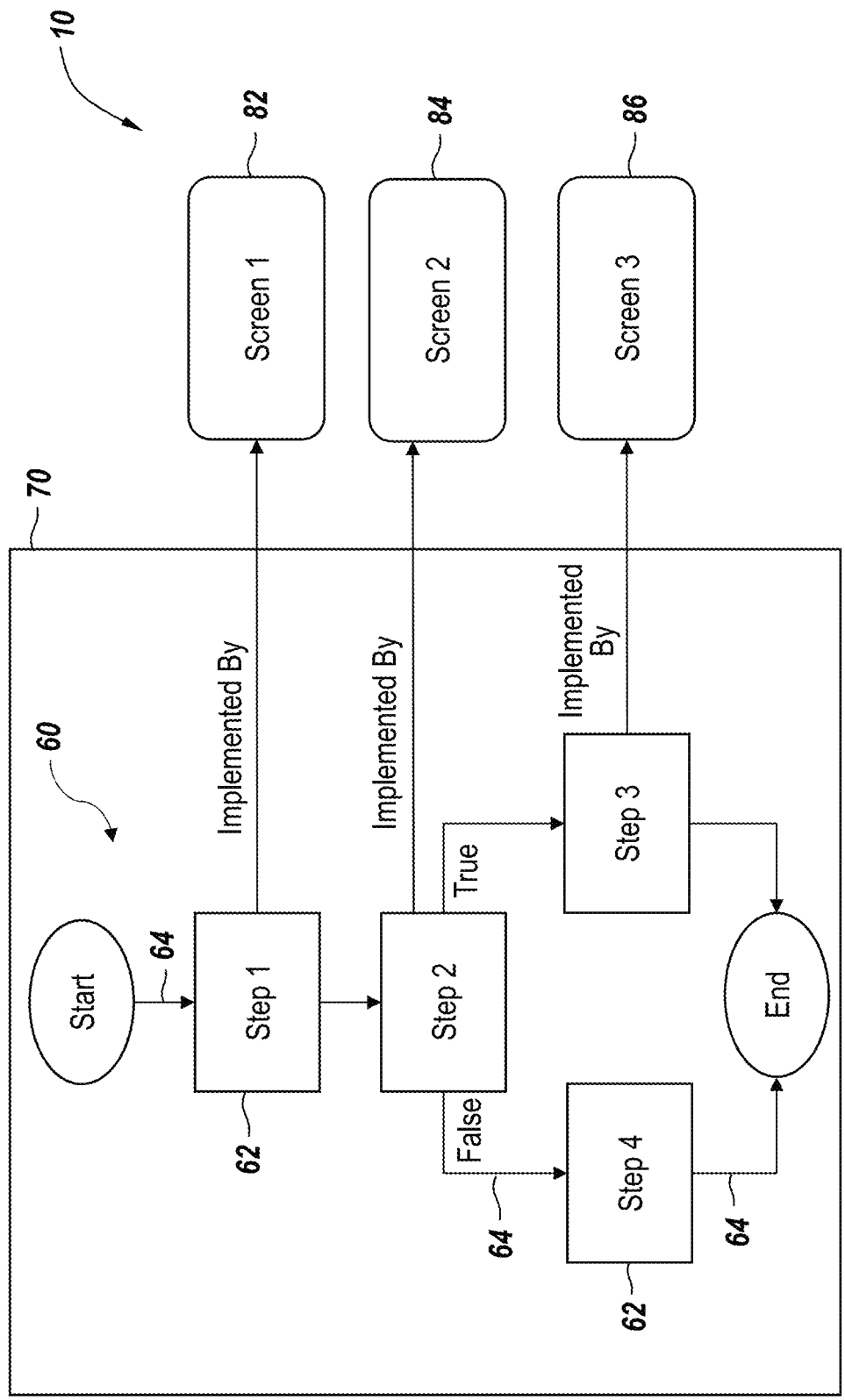
FIG. 4 is a schematic depiction of a process flow diagram on a display with a plurality of technical artifacts from a list of technical artifacts imported into the process flow diagram by an operator and assigned to selected process nodes according to the teachings of the present invention.

FIG. 4 shows the relationship between the nodes 62 in the process flow diagram 60 and the technical artifacts 82, 84, 86 after the artifacts are imported 81 into the process flow diagram 60. The operator can access and display the target artifacts that are supporting or implementing the operations associated with the nodes 62 and edges 64 of the diagram 60. For example and by way of illustration, the node 62 entitled Step 1 is associated with and implemented by the Screen 1 artifact 82; the node 62 entitled Step 2 can be associated with and implemented by the Screen 2 artifact 84; and the node 62 entitled Step 3 can be associated with and implemented by the Screen 3 artifact 86. Consequently, the system 10 can display to the operator not only the steps in the process flow diagram 60, but also the individual user interfaces (e.g., technical artifacts) of the underlying target applications that are used at each step of the process and which is supported thereby.

FIG. 5 illustrates the process flow diagram 60 and a separate window or pane 100 in which a fragment or a portion of the architecture 110 of the target application to which the technical artifact belongs is shown, including the associated target and other applications or software programs 102, 104 and the data stores 106, 108 employed by the target application during execution of the operations associated with one of the nodes 62. The contents of the illustrated window pane 100 can be generated by the architecture diagram unit 26, and can be copied or imported into the process flow diagram 60 by the operator, such as for example by a drag and drop operation.

Figure 7:
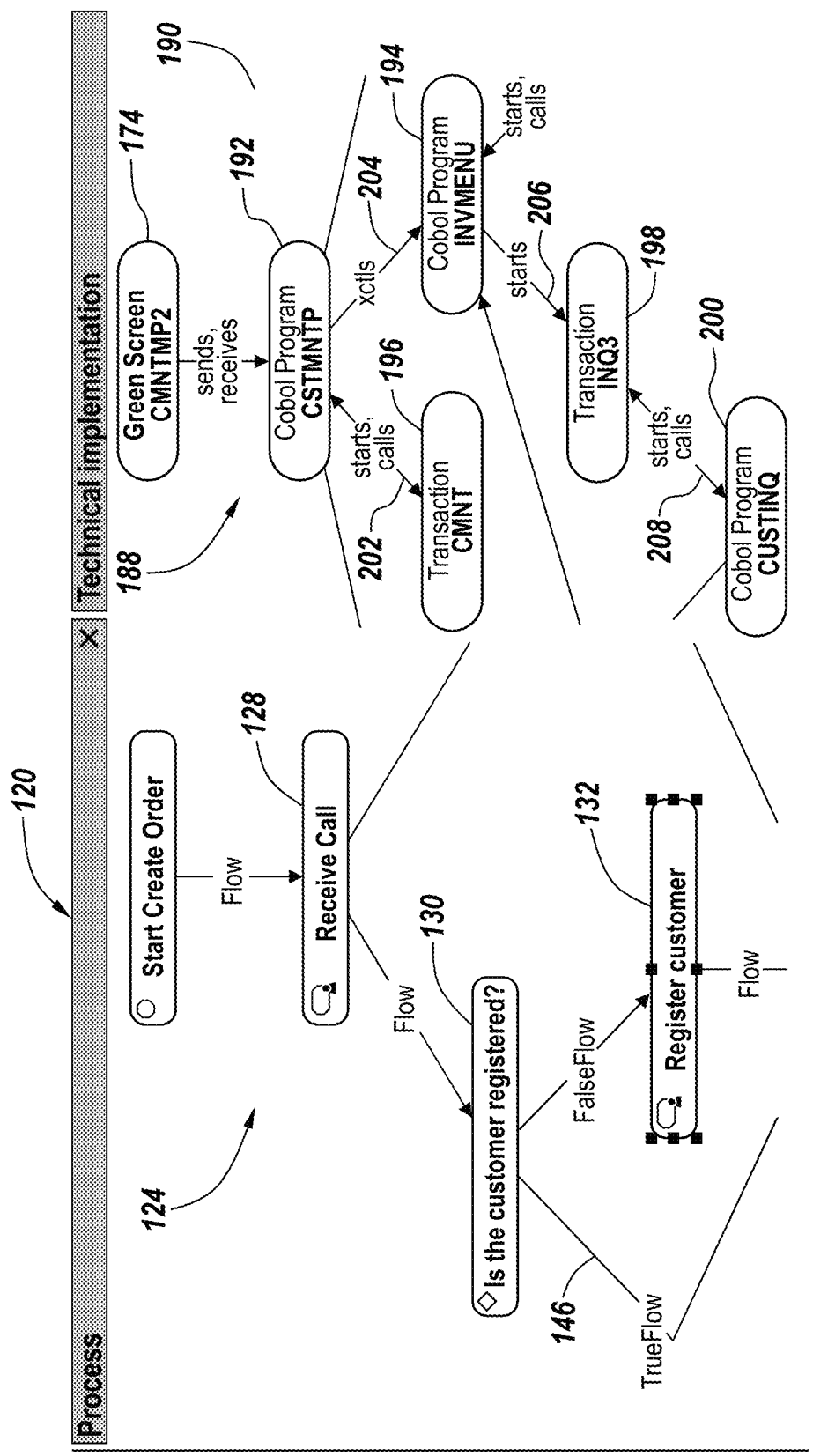
FIG. 7 is a schematic representation of a window or pane element in a display that shows the specifics of the target applications and associated communications therein or therebetween that are associated with a selected node in a process flow diagram according to the teachings of the present invention.

As shown, the node entitled Step 1 can have a technical artifact, such as artifact 82, associated therewith. The operator can actuate or select the node Step 1 and then the system generates the window 100 showing at least a portion of the architecture 110 of the associated technical artifact. With regard to the illustrated window 100, the technical artifact 82 entitled Screen 1 can be associated with a target application or one or more other technical artifacts and can be expanded by the operator to display therein the architecture of the technical artifact. The technical artifact can optionally have other artifacts associated therewith, and can include other technical or programmatic operations or functionalities, such as programs called or executed, such as for example Program 1 102 and Program 2 104, as well as data stores, such as File 1 106 and Table 1 108. The expansion of the technical artifact 82 can be triggered, for example, by a submenu of a context menu accessed by a right-click on the box designating the user interface or Screen 1. The expanded content associated with the user interface (e.g., list of artifacts 80) can be triggered by a menu or submenu of the window 70 that shows the process flow diagram 60, or can be implemented by a function key which becomes active once the window is selected. FIG. 7 is a suitable example of an expansion of a technical artifact associated with a node in the flow diagram.

The expansion of the user interface box or window can be done one step at a time or multiple steps at a time. For example, if an expansion is requested starting with the user interface box (UI box), the system 10 of the present invention can create another box (program box) designating a program which communicates with the user interface. Then the operator can select the box designating a selected program (e.g., programs 102, 104) and then expand the program box, and as a result another box appears designating a program called by the previous program. The same step can be repeated multiple times, and as a result, the operator can display and determine not only the immediate user interface on which the target application user acts, but also the additional applications associated with the technical implementation of the functionality of the user interface. As a result, the process flow diagram 60 can display the process steps while simultaneously the architecture diagram unit 30 can display in the window 100 the technical artifacts which assist with the implementation of the functionality of the target application utilized by the process flow diagram. The concurrent display of the two diagrams (the process flow diagram and the architecture diagram) is illustrated for example in FIG. 7.

Figure 6:
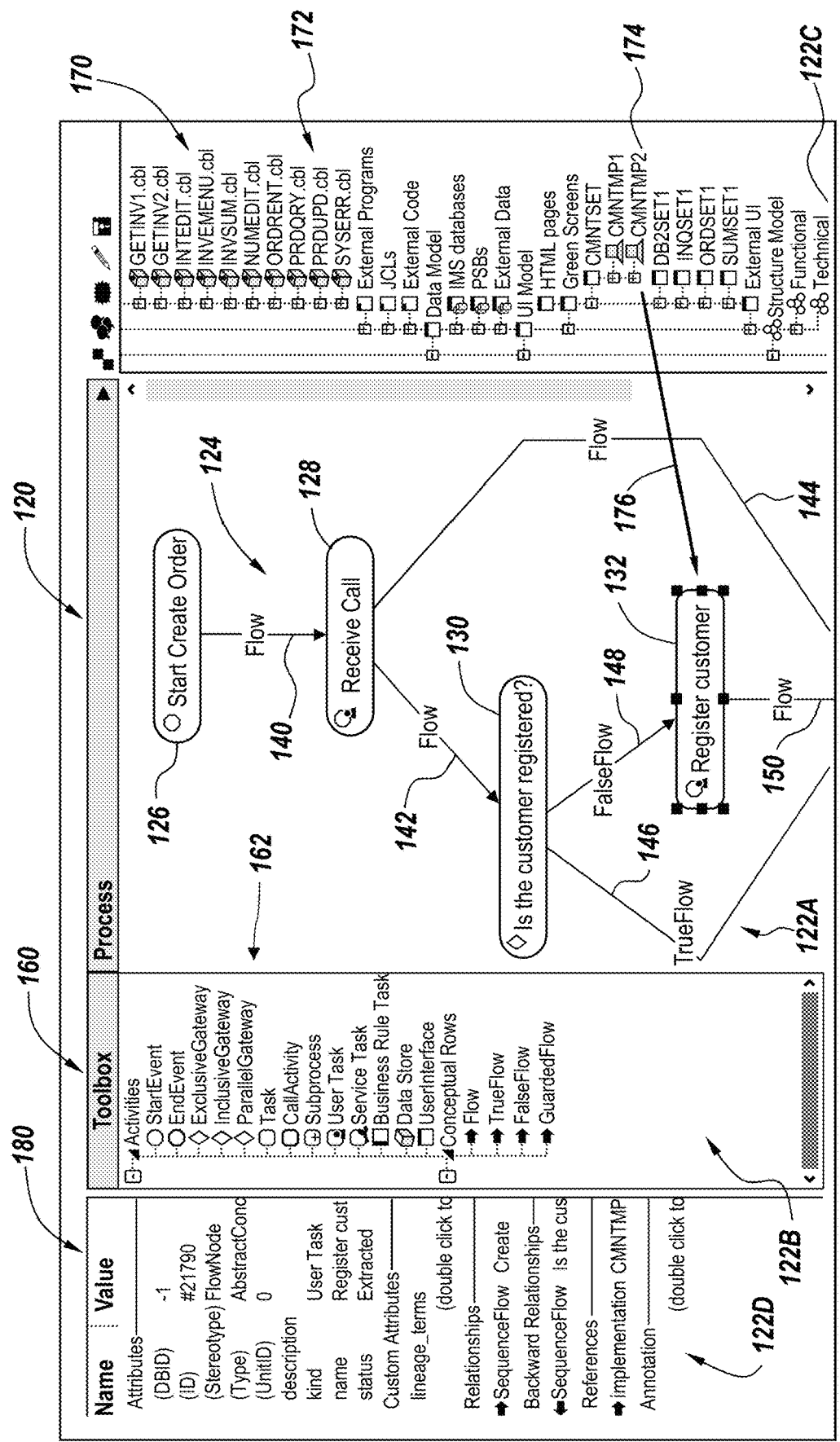
FIG. 6 is a schematic diagram of a window displayed by the system of the present invention illustrating a process flow diagram, a toolbox of node creation items, a list of technical artifacts importable into the process flow diagram, and an implementation relationship between target software applications and one or more nodes in the process flow diagram when associated with a technical artifact.

FIG. 6 is a schematic depiction of a window 120 viewable on a display device of the visual application unit 28 according to the teachings of the present invention. The window 120 can be displayed by the visual application unit 28 of the process flow identification system 10 of the present invention. The window 120 displays in a central pane element 122A a process flow diagram 124 generated by the process flow diagram unit 26. The process flow diagram includes nodes 126, 128, 130 and 132 and includes edges or flows 140, 142, 144, 146, 148 and 150. The illustrated nodes can be created by selecting one or more of the node creation item types set forth in the illustrated node menu list or toolbox 160. The toolbox 160 can be displayed in a left pane element 122B. As shown, the toolbox 160 lists or sets forth different types of node generating items 162 that are selectable by the operator. Once selected, a corresponding node is generated or created and then displayed in the window 120 as part of the process flow diagram 124. Once the nodes are created, the operator can assign or select edges or flows that link or connect together selected nodes. The edges or flows are illustrated in the process flow diagram 124. The operator can then select one or more technical artifacts 172 from a list of technical artifacts 170 (e.g., representations of the technical artifacts). The list can be displayed in a right pane element 122C of the window 120 or in a separate window. The technical artifacts 170 are extracted or acquired by the data extraction unit 14 and displayed via the project explorer tool 24 and/or the visual application unit 28. The operator can select via a user selection device one or more of the listed technical artifacts, such as by clicking on the corresponding artifact or by performing a drag and drop operation with a mouse device, and then associate the selected artifact with one of the illustrated nodes 126-132. The system 10 then creates an implementation association between the node and the selected technical artifact. The implementation associations can be set forth in a list of associations 180 that set forth information of the associated target software applications that are implementing the operations or instructions associated with the nodes and/or flows of the process flow diagram 124. The implementation list 180 can be displayed in a separate window or as a pane element 122D of window 120. The information associated with the implementation list 180 can include any selected type of identification and attribute data, including for example names and values associated with attributes of the target applications, relationship information, reference information, identification information and the like. In the illustrated list of technical artifacts 170, the operator can select for example a selected screen, such as screen 174, and then drag and drop or import 176 the selected screen into the process flow diagram 124 and associate the technical artifact 174 with a selected node, such as for example node 132. The node 132 is hence linked with the technical artifact 174. Further, the system 10 automatically creates an implementation relationship 180 between the process node 132 and the selected technical artifact 174, as well as with any selected target software application.

The node 132 can be actuated by the operator by clicking on the process node with an actuation or user selection device, such as a mouse. Once actuated, the technical artifact 174 associated with the node 132 and the target application corresponding to the technical artifact can be displayed. FIG. 7 for example illustrates the process flow diagram 120 of FIG. 6 and illustrates the window or pane element 190 that can be displayed when the node 132 is actuated. The window or pane element 190 can show the architecture 188 of the technical artifact 174 associated with the node 132. The technical artifact 174 can correspond, for example, to a selected screen. The target application associated with the screen can also be displayed, along with a series of communications (e.g., calls) between components or portions of an application as well as between various target applications. As shown, the pane element 190 can display the target applications 192, 94, 196, 198, and 200, as well as the communications or calls 202, 204, 206, and 208 between the applications. Thus, the pane 190 displays a section or section of the architecture which implements the functionality of the selected node 132.

FIGS. 1, 8 and 9 illustrate reports that can be generated by the process flow identification system 10 of the present invention. Specifically, the illustrated report generator 40 can be employed to generate the reports. The generation of the report can be triggered by a menu item or a button available in system 10. FIG. 8 illustrates a report 220 that shows the specific data stores that are accessed at each process node, as well as the kind or type of access that occurs. The report can arrange the information in any selected format, and preferably displays the information in a tabular format. The illustrated report 220 can include in a first column 222 the process nodes of the process flow diagram that are associated with programmatic functions or system calls. As shown, the identification data (e.g., names) associated with the process nodes can be provided, along with optionally the technical artifacts that are associated therewith. Column 224 in the table 220 provides information associated with the files or tables that the corresponding process node executes delete operations. Column 226 shows on which files or tables the process node executes read operations. Column 228 shows on which files or tables the process node executes write operations. The columns 224, 226, and 228 of the report 220 can also set forth different types of programmatic functions or operations that are associated with the target applications associated via the technical artifacts with the process nodes. Those of ordinary skill in the art will readily recognize that the report 220 can include other types of process related information, such as for example the name of the target application that performs the selected action or operation. The report 220 is useful in identifying the data that is affected by each step in the process.

FIG. 9 illustrates a different type of report 240, which reverses the information in the report 220 of FIG. 8, showing which steps affect a particular data store. For example, the illustrated report 240 includes column 242 that lists a series of data stores, while columns 244, 246 and 248 show the exact process steps or nodes which perform delete, read or write operations to the corresponding data store in column 242. This report may be useful in identifying the process steps which perform operations against a particular data store. For example, if during the execution of the application it is found that records are inadvertently been deleted from a table, an analyst may easily find which process steps might have performed this operation.

Figure 10:
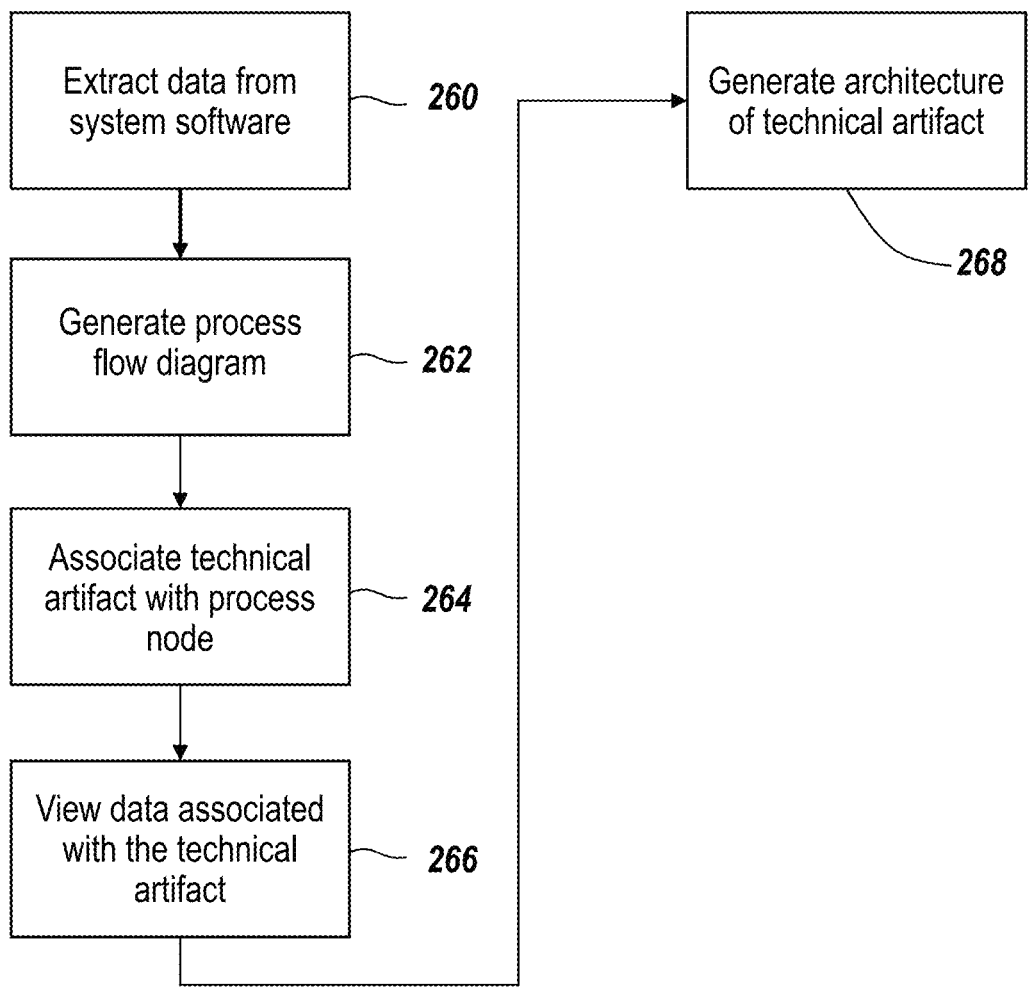
FIG. 10 is a schematic flow chart diagram showing the steps for creating a process flow diagram and associating technical artifacts therewith according to the teachings of the present invention.

In operation, the process flow identification system 10 of the present invention can be employed to generate a process flow diagram and then associate with one or more nodes of the process flow diagram one or more technical artifacts that are associated with one or more target applications. As shown in FIGS. 1 and 10, the process flow identification system 10 includes a data extraction unit 14 for extracting the technical artifacts from the system software and generating extracted data 16, step 260. Specifically, the data extraction unit 14 can acquire and/or extract the instances where applications, functions, or methods are communicating with other applications, functions or methods in the system 10 or associated systems or applications. For example, the data extraction unit 14 can capture, acquire or extract instances (e.g., technical artifacts) where a program or function or method communicates with another application or function or method. The data acquisition unit 14 also captures the various instances when an application or function or method is accessing a data store, such as a table or record or file, through an operation such as read, write, select, update, insert or delete. The extracted data 16 helps establish the connections between the process flow steps or nodes as seen by the operator. The data extraction unit 14 can be implemented using known reverse engineering tools or applications, such as for example by using known static analysis tools. The extracted data can be stored in the storage unit 18.

The system 10 can then create a process flow diagram 60 that includes information about a selected process by employing the process flow diagram unit 26, step 262. The process flow diagram can be created from a toolbox 160 having a list of node types or can be imported into the system. The process flow diagram can include a plurality of nodes 62 and a plurality of edges or flows 64. The system 10 can also include a project explorer tool 24 that sets forth and lists the technical artifacts extracted by the data extraction unit 14. The project explorer tool 24 can also provide connections between the selected nodes in the process flow diagram. The architecture diagram unit 30 of the system 10 further generates an architecture or outline of the target applications and associated programmatic functions or system calls associated with each of the technical artifacts that are associated with the process flow diagram. The process flow diagram and the technical artifacts can be displayed on the visual application unit, which can include a display device.

The operator using a user selection device 32 can then associate a technical artifact with one or more of the nodes 62 of the process flow diagram 60, step 264. The technical artifact associates one or more technical functions with the process node and/or flows or edges, where the technical functions are associated with one or more target software applications. Hence, the node is associated with the underlying target software that can perform or implement the action associated with the node. The operator 32 can access or view the technical artifact by actuating (e.g., clicking on) or accessing the technical information associated with the node, step 266. The operator can associate a selected technical artifact with each node in the process flow diagram that is performed or implemented by software.

The contents and architecture of the technical artifact can be generated by the architecture diagram unit 26, and can be copied or imported into the process flow diagram by the operator, such as for example by a drag and drop operation, step 268. The architecture of the technical artifact can be displayed, such as for example by the visual application unit 28. The architecture or a selected technical artifact showing the associated target applications and programmatic operations is shown for example in FIGS. 5 and 7.

An advantage of associating a technical artifact with a process node and allowing access thereto by the operator is that if one or more steps of the overall process is changed, then the operator can easily access and view the associated target applications so as to easily and readily determine what if anything needs to be modified.

FIGS. 6-8 illustrate how the steps or nodes in the process flow diagram and the associated or supporting technical artifacts are linked and shown together. According to one aspect, the operator or end user can request that the architecture of the technical artifact be expanded and displayed. The method to request this can be done in the same way as a one-step expansion is requested. The operator can also select all or contiguous parts of an architecture diagram or tree extracted by the data extraction unit 14 and import one or more of the technical artifacts, such as by a drag and drop mechanism, into the process flow diagram. As a result, the original process flow diagram can also show the full technical implementation of the process step or node, as shown in FIG. 6.

In most process flow diagrams having process nodes and edges, the system 10 can associate therewith information or data about the actual programs represented thereby or associated therewith, as well as the relationships between the programs. The process flow diagram usually conforms to a metamodel, either a standard one, like BPMN, or a proprietary one. The present invention does not require a fixed metamodel. In one implementation, the model to which the diagram conforms may be entirely a process model, such as BPMN. In this case, the process nodes can represent software artifacts, such as screens, programs and tables, and can be represented as BPMN process entities. However, if a process node representing, for example, a screen, is presented as a process task, then the system 10 can also track the technical artifact represented thereby. The architecture of the process node can be displayed by actuating 83 the process node, and hence immediately navigating from the node to the representation of the actual screen of the artifact, such that the operator can display the screen, FIG. 3. In the case of a program, the operator can immediately navigate to the actual program code or to a diagrammatic representation of the program control flow. This allows the end user or operator to seamlessly switch between the pure process representation or depiction in the process flow diagram to the representation or depiction of the underlaying target applications associated with the technical artifacts.

According to still another practice, the operator can start with the technical artifacts and then import the artifacts into the process flow diagram, as described above, by viewing and selecting the artifacts in another window or pane, and then copying the artifacts (i.e., by a drag and drop mechanism) into the diagram. The operator can then create process nodes, join them together using process flows or edges, and then create an "ImplementedBy" relationship between the artifacts and the nodes and/or edges to indicate which process nodes are implemented or supported by a selected technical artifact.

It is to be understood that although the invention has been described above in terms of particular embodiments, the foregoing embodiments are provided as illustrative only, and do not limit or define the scope of the invention. Various other embodiments, including but not limited those described herein are also within the scope of the claims. For example, elements, units, tools and components described herein may be further divided into additional components or joined together to form fewer components for performing the same functions.

Any of the functions disclosed herein may be implemented using means for performing those functions. Such means include, but are not limited to, any of the components disclosed herein, such as the electronic or computing device components described herein.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

The term computing device or electronic device can refer to any device that includes a processor and a computer-readable memory capable of storing computer-readable instructions, and in which the processor is capable of executing the computer-readable instructions in the memory. The terms computer system and computing system refer herein to a system containing one or more computing devices.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may operate on digital electronic processes which can only be created, stored, modified, processed, and transmitted by computing devices and other electronic devices. Such embodiments, therefore, address problems which are inherently computer-related and solve such problems using computer technology in ways which could not be solved manually or mentally by humans.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Embodiments of the present invention solve one or more problems that are inherently rooted in computer technology.

For example, embodiments of the present invention solve the problem of how to associate a technical artifact with a node of a process flow diagram. There is no analog to this problem in the non-computer environment, nor is there an analog to the solutions disclosed herein in the non-computer environment.

Furthermore, embodiments of the present invention represent improvements to computer and communication technology itself. For example, the system 10 of the present can optionally employ a specially programmed or special purpose computer in an improved computer system, which may, for example, be implemented within a single computing device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements can also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

It should be appreciated that various concepts, systems and methods described above can be implemented in any number of ways, as the disclosed concepts are not limited to any particular manner of implementation or system configuration. Examples of specific implementations and applications are discussed below and shown in FIG. 11 primarily for illustrative purposes and for providing or describing the operating environment of the system of the present invention. The process flow identification system 10 and/or elements or units thereof can employ one or more electronic or computing devices, such as one or more servers, clients, computers, laptops, smartphones and the like, that are networked together or which are arranged so as to effectively communicate with each other. The network can be any type or form of network. The devices can be on the same network or on different networks. In some embodiments, the network system may include multiple, logically-grouped servers. In one of these embodiments, the logical group of servers may be referred to as a server farm or a machine farm. In another of these embodiments, the servers may be geographically dispersed. The electronic devices can communicate through wired connections or through wireless connections. The clients can also be generally referred to as local machines, clients, client nodes, client machines, client computers, client devices, endpoints, or endpoint nodes. The servers can also be referred to herein as servers, server nodes, or remote machines. In some embodiments, a client has the capacity to function as both a client or client node seeking access to resources provided by a server or server node and as a server providing access to hosted resources for other clients. The clients can be any suitable electronic or computing device, including for example, a computer, a server, a smartphone, a smart electronic pad, a portable computer, and the like, such as the electronic or computing device 300. The present invention can employ one or more of the illustrated computing devices and can form a computing system. Further, the server may be a file server, application server, web server, proxy server, appliance, network appliance, gateway, gateway server, virtualization server, deployment server, SSL VPN server, or firewall, or any other suitable electronic or computing device, such as the electronic device 300. In one embodiment, the server may be referred to as a remote machine or a node. In another embodiment, a plurality of nodes may be in the path between any two communicating servers or clients. The process flow identification system 10 which includes the data extraction unit 14, the storage unit 18, the project explorer tool 24, the process flow diagram unit 26, the visual application unit 28, and the architecture diagram unit ("elements: of the system) can be stored on one or more of the clients or servers, and the hardware associated with the client or server, such as the processor or CPU and memory described below.

Figure 11:
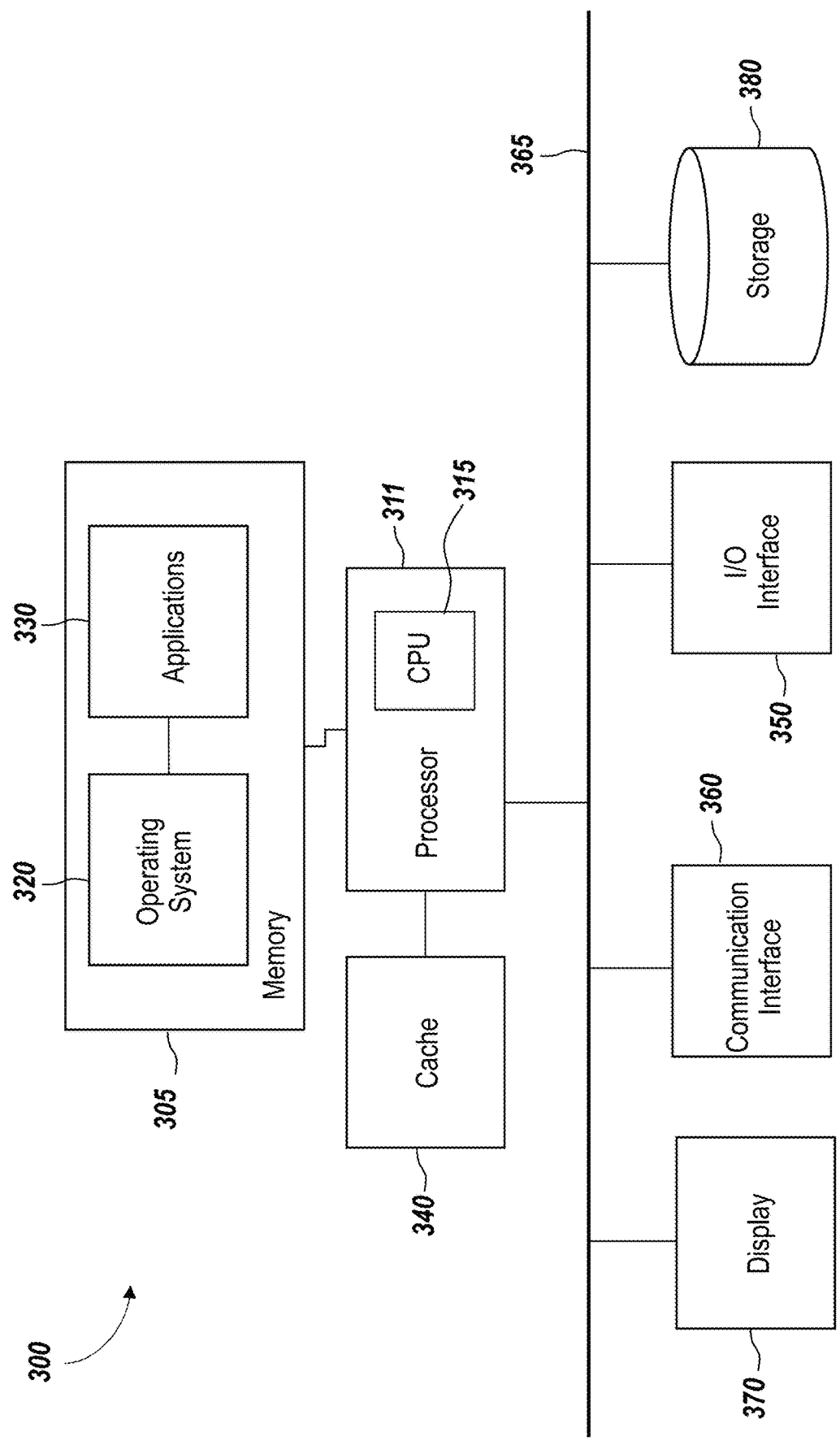
FIG. 11 is a schematic diagram of an electronic device and/or associated system suitable for implementing the process flow identification system of the present invention.

FIG. 11 is a high-level block diagram of an electronic or computing device 300 that can be used with the embodiments disclosed herein. Without limitation, the hardware, software, and techniques described herein can be implemented in digital electronic circuitry or in computer hardware that executes firmware, software, or combinations thereof. The implementation can include a computer program product (e.g., a non-transitory computer program tangibly embodied in a machine-readable storage device, for execution by, or to control the operation of, one or more data processing apparatuses, such as a programmable processor, one or more computers, one or more servers and the like).

The illustrated electronic device 300 can be any suitable electronic circuitry that includes a main memory unit 305 that is connected to a processor 311 having a CPU 315 and a cache unit 340 configured to store copies of the data from the most frequently used main memory 305. The electronic device can implement the process flow identification system 10 or one or more elements of the process flow identification system.

Further, the methods and procedures for carrying out the methods disclosed herein can be performed by one or more programmable processors executing a computer program to perform functions of the invention by operating on input data and generating output. Further, the methods and procedures disclosed herein can also be performed by, and the apparatus disclosed herein can be implemented as, special purpose logic circuitry, such as a FPGA (field programmable gate array) or an ASIC (application specific integrated circuit). Modules and units disclosed herein can also refer to portions of the computer program and/or the processor/special circuitry that implements that functionality.

The processor 311 is any logic circuitry that responds to, processes or manipulates instructions received from the main memory unit, and can be any suitable processor for execution of a computer program. For example, the processor 311 can be a general and/or special purpose microprocessor and/or a processor of a digital computer. The CPU 315 can be any suitable processing unit known in the art. For example, the CPU 315 can be a general and/or special purpose microprocessor, such as an application-specific instruction set processor, graphics processing unit, physics processing unit, digital signal processor, image processor, coprocessor, floating-point processor, network processor, and/or any other suitable processor that can be used in a digital computing circuitry. Alternatively or additionally, the processor can comprise at least one of a multi-core processor and a front-end processor. Generally, the processor 311 can be embodied in any suitable manner. For example, the processor 311 can be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. Additionally or alternatively, the processor 311 can be configured to execute instructions stored in the memory 305 or otherwise accessible to the processor 311. As such, whether configured by hardware or software methods, or by a combination thereof, the processor 311 can represent an entity (e.g., physically embodied in circuitry) capable of performing operations according to embodiments disclosed herein while configured accordingly. Thus, for example, when the processor 311 is embodied as an ASIC, FPGA or the like, the processor 311 can be specifically configured hardware for conducting the operations described herein. Alternatively, as another example, when the processor 311 is embodied as an executor of software instructions, the instructions can specifically configure the processor 311 to perform the operations described herein. In many embodiments, the central processing unit 530 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The processor can be configured to receive and execute instructions received from the main memory 305.

The electronic device 300 applicable to the hardware of the present invention can be based on any of these processors, or any other processor capable of operating as described herein. The central processing unit 315 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

The processor 311 and the CPU 315 can be configured to receive instructions and data from the main memory 305 (e.g., a read-only memory or a random access memory or both) and execute the instructions. The instructions and other data can be stored in the main memory 305. The processor 311 and the main memory 305 can be included in or supplemented by special purpose logic circuitry. The main memory unit 305 can include one or more memory chips capable of storing data and allowing any storage location to be directly accessed by the processor 311. The main memory unit 305 may be volatile and faster than other memory in the electronic device, or can dynamic random access memory (DRAM) or any variants, including static random access memory (SRAM), Burst SRAM or Synch-Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 305 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 305 can be based on any of the above described memory chips, or any other available memory chips capable of operating as described herein. In the embodiment shown in FIG. 4, the processor 311 communicates with main memory 305 via a system bus 365. The computer executable instructions of the present invention may be provided using any computer-readable media that is accessible by the computing or electronic device 300. Computer-readable media may include, for example, the computer memory or storage unit 305. The computer storage media may also include, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer readable storage media does not include communication media. Therefore, a computer storage or memory medium should not be interpreted to be a propagating signal per se or stated another transitory in nature. The propagated signals may be present in a computer storage media, but propagated signals per se are not examples of computer storage media, which is intended to be non-transitory. Although the computer memory or storage unit 305 is shown within the computing device 300 it will be appreciated that the storage may be distributed or located remotely and accessed via a network or other communication link.

The main memory 305 can comprise an operating system 320 that is configured to implement various operating system functions. For example, the operating system 320 can be responsible for controlling access to various devices, memory management, and/or implementing various functions of the asset management system disclosed herein.

Generally, the operating system 320 can be any suitable system software that can manage computer hardware and software resources and provide common services for computer programs.

The main memory 305 can also hold application software 330. For example, the main memory 305 and application software 330 can include various computer executable instructions, application software, and data structures, such as computer executable instructions and data structures that implement various aspects of the embodiments described herein. For example, the main memory 305 and application software 330 can include computer executable instructions, application software, and data structures, such as computer executable instructions and data structures that implement various aspects of the content characterization systems disclosed herein, such as processing and capture of information. Generally, the functions performed by the content characterization systems disclosed herein can be implemented in digital electronic circuitry or in computer hardware that executes software, firmware, or combinations thereof. The implementation can be as a computer program product (e.g., a computer program tangibly embodied in a non-transitory machine-readable storage device) for execution by or to control the operation of a data processing apparatus (e.g., a computer, a programmable processor, or multiple computers). Generally, the program codes that can be used with the embodiments disclosed herein can be implemented and written in any form of programming language, including compiled or interpreted languages, and can be deployed in any form, including as a stand-alone program or as a component, module, subroutine, or other unit suitable for use in a computing environment. A computer program can be configured to be executed on a computer, or on multiple computers, at one site or distributed across multiple sites and interconnected by a communications network, such as the Internet.

The processor 311 can further be coupled to a database or data storage 380. The data storage 380 can be configured to store information and data relating to various functions and operations of the content characterization systems disclosed herein. For example, as detailed above, the data storage 380 can store information including but not limited to captured information, multimedia, processed information, and characterized content.

A wide variety of I/O devices may be present in or connected to the electronic device 300. For example, the electronic device can include a display 370, and as previously described, the visual application unit 28 or one or more other elements of the system 10 can include the display. The display 370 can be configured to display information and instructions received from the processor 311. Further, the display 370 can generally be any suitable display available in the art, for example a Liquid Crystal Display (LCD), a light emitting diode (LED) display, digital light processing (DLP) displays, liquid crystal on silicon (LCOS) displays, organic light-emitting diode (OLED) displays, active-matrix organic light-emitting diode (AMO-LED) displays, liquid crystal laser displays, time-multiplexed optical shutter (TMOS) displays, or 3D displays, or electronic papers (e-ink) displays. Furthermore, the display 370 can be a smart and/or touch sensitive display that can receive instructions from a user and forwarded the received information to the processor 311. The input devices can also include user selection devices, such as keyboards, mice, trackpads, trackballs, touchpads, touch mice, multi-touch touchpads, touch mice and the like, as well as microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. The output devices can also include video displays, graphical displays, speakers, headphones, inkjet printers, laser printers, and 3D printers.

The electronic device 300 can also include an Input/Output (I/O) interface 350 that is configured to connect the processor 311 to various interfaces via an input/output (I/O) device interface 380. The device 300 can also include a communications interface 360 that is responsible for providing the circuitry 300 with a connection to a communications network (e.g., communications network 120). Transmission and reception of data and instructions can occur over the communications network.

The invention claimed is:

1. A method performed by at least one computer processor for associating a technical artifact with one or more portions of a process flow diagram, the method comprising
extracting a plurality of technical artifacts from a computing system having a plurality of software applications, wherein the plurality of software applications includes one or more target applications,
providing a process flow diagram having a plurality of nodes and a plurality of edges separate and distinct from the plurality of technical artifacts,
associating one or more of the plurality of technical artifacts with one or more of the plurality of nodes of the process flow diagram,
displaying the process flow diagram, and
when the node is actuated, displaying an architectural diagram of the associated technical artifact, wherein the plurality of technical artifacts are representative of instances where one or more of the plurality of software applications communicates with one or more of the target software application, and
determining, when the technical artifact is associated with the process node, the one or more target applications that require modification when the process flow diagram is modified;
wherein the step of providing a process flow diagram comprises creating the process flow diagram or importing the process flow diagram.

2. The method of claim 1, wherein each of the plurality of technical artifacts comprises one or more supporting technical functions of the computing system.

3. The method of claim 1, wherein each of the plurality of technical artifacts comprises one or more of a software object, a batch job, a screen, a window, one or more panes of the window, a page, a web service, a script, a table, or a file.

4. The method of claim 1, wherein the step of associating further comprises selecting, by an operator, one or more of the technical artifacts and then associating the selected technical artifact with the one or more nodes.

5. The method of claim 4, further comprising
actuating the node and selecting the associated technical artifact, and
displaying an architecture of the technical artifact.

6. A system for associating a technical artifact with a process flow diagram, comprising
a data extraction unit for extracting one or more technical artifacts from a plurality of software applications, wherein the plurality of software applications includes one or more target software applications, wherein the plurality of technical artifacts are representative of instances where one or more of the plurality of software applications communicates with the one or more target software applications, a project explorer tool for receiving the technical artifacts and for forming a list of the technical artifacts, a process flow diagram unit for providing a process flow diagram having a plurality of nodes and a plurality of edges separate and distinct from the plurality of technical artifacts, wherein one or more of the plurality of nodes is implemented by one or more of the plurality of technical artifacts when associated therewith and the plurality of edges represent relationships there between, an architecture diagram unit for generating an architecture diagram of each of the plurality of technical artifacts associated with the process flow diagram;

wherein the architecture diagram of each of the technical artifacts generated by the architecture diagram unit includes one or more programmatic relationships between one or more of the plurality of nodes, and a visual application unit for displaying the process flow diagram generated by the process flow diagram unit and for displaying the technical artifacts from the project explorer tool, wherein the project explorer tool is configured to associate one or more of the plurality of nodes with one or more of the plurality of technical artifacts and generating an implementation relationship between the technical artifact and the process node, such that the technical artifact executes the process node, and wherein the association of the technical artifact with the process node enables the project explorer tool to determine the one or more target applications associated therewith and if the process flow diagram is modified, then the project explorer tool is configured to provide information indicative of the one or more target applications to be modified;

wherein the step of providing a process flow diagram comprises creating the process flow diagram or importing the process flow diagram.

7. The system of claim 6, wherein the data extraction unit extracts instances where at least one of the plurality of software applications accesses at least another one of the plurality of software applications, wherein the instances form the technical artifacts.

8. The system of claim 6, wherein the data extraction unit extracts instances when at least one of the plurality of software applications accesses a data store through a programmatic operation.

9. The system of claim 8, wherein the data store includes one of a table, a record, and a file.

10. The system of claim 8, wherein the programmatic operation comprises one or more of a read operation, a write operation, a select operation, an update operation, an insert operation and a delete operation.

11. The system of claim 6, wherein an operator selects at least one of the technical artifacts and associates the selected technical artifact with one of the plurality of nodes.

12. The system of claim 8, further comprising a report generator for generating a report that includes data associated with the data stores that are accessed during the execution of the node, wherein the data in the report includes information associated with delete, read and write operations.

13. The system of claim 6, wherein when one or more of the plurality of nodes is selected, the visual application unit displays the technical artifact associated therewith and any associated implementation relationship.

14. The system of claim 6, wherein the architecture of each of the technical artifacts generated by the architecture diagram unit includes programmatic relationships between the node representing the artifact and one or more of the nodes representing other technical artifacts.

15. The system of claim 14, wherein the programmatic relationships include one or more of programmatic calls, data access operations, send requests, or read requests.

16. The system of claim 6, wherein the process flow diagram unit employs a flow modeling software application to generate the process flow diagram.

17. The system of claim 16, wherein the flow modeling software application includes a Business Process Model and Notation (BPMN) model or a Unified Modeling Language (UML) model.

18. The system of claim 6, further comprising a storage unit for storing information about the technical artifacts extracted by the data extraction unit, wherein the storage unit includes a database for storing the information about the technical artifacts.

19. The system of claim 6, wherein the architecture diagram unit is configured to generate at least a portion of the architecture diagram associated with one or more of the technical artifacts when associated with one or more of the plurality of nodes and when selected by the user, wherein the one or more of the plurality of nodes and the technical artifact are associated with one or more of the target applications.

20. The system of claim 19, wherein the plurality of node types are displayed in a list in the form of a toolbox.

21. The system of claim 6, further comprising one or more computer processors programmed to:
  display a plurality of flow diagram node types or edge types,
  display the plurality of technical artifacts,
  display the process flow diagram,
  select one of the plurality of technical artifacts and associate the selected technical artifact with one of the plurality of nodes of the process flow diagram, and
  generating an implementation relationship between the technical artifact and one or more associated target applications.

22. The system of claim 21, wherein the processor is further programmed to connect each of the plurality of nodes with at least one other of the plurality of nodes with at least one of the plurality of edges so as to form a sequence of steps.

23. The system of claim 22, wherein the plurality of node types are displayed in a list in the form of a toolbox.

24. The system of claim 6, wherein the technical artifact comprises at least one of a user interface, form, screen, method, function, program, table, segment, record, or file.

25. A computer implemented method for associating a technical artifact with a process flow diagram, the method comprising
  extracting one or more technical artifacts from a plurality of software applications, wherein the plurality of software applications includes one or more target software applications, and wherein the plurality of technical artifacts are representative of instances where one or more of the plurality of software applications communicates with one or more target software applications,
  receiving the technical artifacts and forming a list of the technical artifacts, generating a process flow diagram having a plurality of nodes and a plurality of edges, that are separate and distinct from the plurality of technical artifacts, wherein one or more of the plurality of nodes is implemented by one or more of the plurality of technical artifacts when associated therewith and the plurality of edges represent relationships there between, based on a user request, generating an architecture diagram of each of the plurality of technical artifacts, selecting at least one of the technical artifacts and associating the selected technical artifact with one of the plurality of nodes, and displaying the process flow diagram and the architecture diagram for each of the associated technical artifacts, associating one or more of the plurality of nodes with one or more of the plurality of technical artifacts and generating an implementation relationship between the technical artifact and the process node, such that the technical artifact executes the process node, and based on the association of the technical artifact with the process node, determining the one or more target applications associated therewith and if the process flow diagram is modified, then providing information indicative of the one or more target applications to be modified;

wherein the step of providing a process flow diagram comprises creating the process flow diagram or importing the process flow diagram.

26. The computer implemented method of claim 25, further comprising extracting instances when at least one of the plurality of software applications, functions, or methods accesses a data store through a programmatic operation.

27. The computer implemented method of claim 26, wherein the programmatic operation comprises one or more of a read operation, a write operation, a select operation, an update operation, an insert operation and a delete operation.

28. The computer implemented method of claim 25, wherein the architecture of each of the technical artifacts includes programmatic relationships between the technical artifact and one or more of the other technical artifacts, and the programmatic relationships include send, receive or call relationships.

29. The computer implemented method of claim 25, further comprising
display a plurality of flow diagram node types or edge types,
generate the process flow node by selecting one or more of the plurality of node types, and
generating an implementation relationship between the technical artifact and one or more other technical artifacts.

30. The computer implemented method of claim 29, further comprising connecting each of the plurality of nodes with at least another one of the plurality of nodes through an edge so as to form a sequence of steps.

31. The computer implemented method of claim 29, further comprising displaying the plurality of node types and the plurality of edge types in a list in the form of a toolbox for use in creating the nodes and the edges.

32. A non-transitory, computer readable medium comprising computer program instructions tangibly stored on the computer readable medium, wherein the computer program instructions are executable by at least one computer processor to perform a method, the method comprising:

extracting one or more technical artifacts from a plurality of software applications, wherein the plurality of software applications includes one or more target software applications, and wherein the plurality of technical artifacts are representative of instances where one or more of the plurality of software applications communicates with one or more target software applications, receiving the technical artifacts and forming a list of the technical artifacts, generating a process flow diagram having a plurality of nodes and a plurality of edges that are separate and distinct from the plurality of technical artifacts, wherein one or more of the plurality of nodes is implemented by one or more of the plurality of technical artifacts when associated therewith and the plurality of edges represent relationships there between;

generating an architecture of each of the plurality of technical artifacts, selecting at least one of the technical artifacts and associating the selected technical artifact with one of the plurality of nodes, and displaying the process flow diagram and for each process node which has an associated technical artifact, displaying an architecture diagram of the associated technical artifact, associating one or more of the plurality of nodes with one or more of the plurality of technical artifacts and generating an implementation relationship between the technical artifact and the process node, such that the technical artifact executes the process node, and based on the association of the technical artifact with the process node, determining the one or more target applications associated therewith and if the process flow diagram is modified, then providing information indicative of the one or more target applications to be modified;

wherein the step of providing a process flow diagram comprises creating the process flow diagram or importing the process flow diagram.

33. The computer readable medium of claim 32, further comprising extracting instances when at least one of the plurality of technical artifacts representing a program, function, procedure or method accesses a data store through a programmatic operation.

34. The computer readable medium of claim 32, wherein the architecture of each of the technical artifacts includes programmatic relationships with other technical artifacts, such as calls, receives or sends.

35. The computer readable medium of claim 32, further comprising
display a plurality of flow diagram node types or edge types,
generate the process flow diagram by selecting one or more of the plurality of node types or edge types, and
generating an implementation relationship between the technical artifact and one or more associated nodes.

36. The computer readable medium of claim 35, further comprising connecting each of the plurality of nodes with at least another one of the plurality of nodes through at least one of the plurality of edges so as to form a sequence of steps.

37. The computer readable medium of claim 35, further comprising displaying the plurality of node types in a list in the form of a toolbox.

38. The computer readable medium of claim 35, wherein one or more of the plurality of nodes has a function associated therewith, and wherein the implementation relationship includes information of the target software applications that are implementing the function associated with the node.

* * * * *